US012324026B2

(12) United States Patent
Kwak et al.

(10) Patent No.: US 12,324,026 B2
(45) Date of Patent: Jun. 3, 2025

(54) BEAM CHANGES DURING RANDOM ACCESS PROCEDURES

(71) Applicant: QUALCOMM Incorporated, San Diego, CA (US)

(72) Inventors: Yongjun Kwak, San Diego, CA (US); Jing Lei, San Diego, CA (US); Huilin Xu, Temecula, CA (US); Hung Dinh Ly, San Diego, CA (US); Seyedkianoush Hosseini, San Diego, CA (US); Yuchul Kim, San Diego, CA (US); Wanshi Chen, San Diego, CA (US); Hwan Joon Kwon, San Diego, CA (US); Krishna Kiran Mukkavilli, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 286 days.

(21) Appl. No.: 17/465,800

(22) Filed: Sep. 2, 2021

(65) Prior Publication Data

US 2022/0078855 A1 Mar. 10, 2022

Related U.S. Application Data

(60) Provisional application No. 63/074,853, filed on Sep. 4, 2020.

(51) Int. Cl.
*H04W 74/0833* (2024.01)
*H04B 7/06* (2006.01)
(Continued)

(52) U.S. Cl.
CPC ...... *H04W 74/0841* (2013.01); *H04B 7/0617* (2013.01); *H04B 7/0639* (2013.01);
(Continued)

(58) Field of Classification Search
CPC ............. H04W 74/0841; H04W 24/08; H04W 56/001; H04W 72/046; H04W 74/0833;
(Continued)

(56) References Cited

U.S. PATENT DOCUMENTS

2018/0324863 A1* 11/2018 Akoum ............... H04W 74/006
2019/0053271 A1* 2/2019 Islam .................. H04W 52/281
(Continued)

FOREIGN PATENT DOCUMENTS

CN 110708147 A * 1/2020 ........... H04L 1/0015
WO WO-2020194758 A1 * 10/2020 ............ H04W 52/36

OTHER PUBLICATIONS

Dahlman et al. 5G NR: The Next Generation Wireless Access Technology, Elsevier Academic Press (Year: 2018).*

*Primary Examiner* — Ayaz R Sheikh
*Assistant Examiner* — David Zhijun Sun
(74) *Attorney, Agent, or Firm* — Holland & Hart LLP

(57) ABSTRACT

Methods, systems, and devices for wireless communications are described. Generally, a user equipment (UE) may monitor synchronization signal resources, each synchronization signal resources associated with a beam, and may select a preferred beam based on the monitoring. The UE may transmit an uplink random access message (e.g., message 3 of a four-step random access message, message A of a two-step random access procedure, or a negative acknowledgement (NACK) message requesting retransmission of a random access message) including beam information (e.g., one or more beam indices, channel quality information, or channel state information) to a base station. In response, the base station may transmit a downlink random access message using a different beam (e.g., a new preferred beam). The UE may establish a connection with the base station based on the completed random access procedure.

30 Claims, 19 Drawing Sheets

(51) Int. Cl.
*H04L 1/1867* (2023.01)
*H04W 24/08* (2009.01)
*H04W 56/00* (2009.01)
*H04W 72/044* (2023.01)

(52) U.S. Cl.
CPC ......... *H04B 7/0695* (2013.01); *H04L 1/1896* (2013.01); *H04W 24/08* (2013.01); *H04W 56/001* (2013.01); *H04W 72/046* (2013.01)

(58) Field of Classification Search
CPC .......... H04W 74/0836; H04W 74/0838; H04B 7/0617; H04B 7/0639; H04B 7/0695; H04L 1/1896; H04L 1/0026; H04L 2001/125; H04L 1/1861
See application file for complete search history.

(56) References Cited

U.S. PATENT DOCUMENTS

2020/0137624 A1* 4/2020 Dhanda ............... H04W 74/004
2022/0007430 A1* 1/2022 Umehara ............. H04B 7/0695
2023/0189344 A1* 6/2023 Su ..................... H04W 74/0833
370/329

* cited by examiner

BEAM CHANGES DURING RANDOM ACCESS PROCEDURES

CROSS REFERENCE

The present Application for Patent claims the benefit of U.S. Provisional Patent Application No. 63/074,853 by KWAK et al., entitled "BEAM CHANGES DURING RANDOM ACCESS PROCEDURES," filed Sep. 4, 2020, assigned to the assignee hereof, and expressly incorporated by reference herein.

TECHNICAL FIELD

The following relates to wireless communications, including beam changes during random access procedures.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). In some examples, a UE may establish a connection with a base station by performing a random access procedure.

SUMMARY

The described techniques relate to improved methods, systems, devices, and apparatuses that support beam changes during random access procedures. Generally, a user equipment (UE) may monitor synchronization signal resources, each synchronization signal resources associated with a beam, and may select a preferred beam based on the monitoring. The UE may transmit an uplink random access message (e.g., message 3 of a four-step random access message, message A of a two-step random access procedure, or a negative acknowledgement (NACK) message requesting retransmission of a random access message) including beam information (e.g., one or more beam indices, channel quality information or channel state information) to a base station. In response, the base station may transmit a downlink random access message (e.g., message 4 of a two-step random access message, message B of a two-step random access message, or a retransmission of a downlink random access message) using a different beam (e.g., a new preferred beam). The UE may establish a connection with the base station based on the completed random access procedure.

A method of wireless communications at a UE is described. The method may include monitoring a set of synchronization signal resources, each synchronization signal resource of the set of synchronization signal resources associated with a beam of a set of beams, transmitting, to a base station using a first beam, an uplink random access message including beam information, receiving, based on the beam information, a downlink random access message using a second beam, and establishing a connection with the base station based on the uplink random access message and the downlink random access message.

An apparatus for wireless communications at a UE is described. The apparatus may include at least one processor, memory coupled (e.g., operatively, communicatively, functionally, electronically, or electrically) to the at least one processor, and instructions stored in the memory. The instructions may be executable by the at least one processor to cause the apparatus to monitor a set of synchronization signal resources, each synchronization signal resource of the set of synchronization signal resources associated with a beam of a set of beams, transmit, to a base station using a first beam, an uplink random access message including beam information, receive, based on the beam information, a downlink random access message using a second beam, and establish a connection with the base station based on the uplink random access message and the downlink random access message.

Another apparatus for wireless communications at a UE is described. The apparatus may include means for monitoring a set of synchronization signal resources, each synchronization signal resource of the set of synchronization signal resources associated with a beam of a set of beams, transmitting, to a base station using a first beam, an uplink random access message including beam information, receiving, based on the beam information, a downlink random access message using a second beam, and establishing a connection with the base station based on the uplink random access message and the downlink random access message.

A non-transitory computer-readable medium storing code for wireless communications at a UE is described. The code may include instructions executable by at least one processor to monitor a set of synchronization signal resources, each synchronization signal resource of the set of synchronization signal resources associated with a beam of a set of beams, transmit, to a base station using a first beam, an uplink random access message including beam information, receive, based on the beam information, a downlink random access message using a second beam, and establish a connection with the base station based on the uplink random access message and the downlink random access message.

In some examples of the method, apparatuses, and non-transitory computer-readable medium described herein, transmitting the uplink random access message may include operations, features, means, or instructions for transmitting a third random access message in a first random access procedure, where the beam information includes at least one beam index associated with the second beam.

In some examples of the method, apparatuses, and non-transitory computer-readable medium described herein, receiving the downlink random access message using the second beam may include operations, features, means, or instructions for receiving a fourth random access message in the first random access procedure using the second beam.

Some examples of the method, apparatuses, and non-transitory computer-readable medium described herein may further include operations, features, means, or instructions for receiving, based on the monitoring, one or more synchronization signals over the set of synchronization signal resources, performing one or more channel quality measurements on the one or more synchronization signals, and generating, based on performing the one or more channel quality measurements, one or more channel quality measurement values, where the beam information further includes the one or more channel quality measurement values.

In some examples of the method, apparatuses, and non-transitory computer-readable medium described herein, the one or more channel quality measurement values include one or more absolute measurement values, one or more offset values from a first channel quality measurement value associated with the second beam, or a combination thereof.

In some examples of the method, apparatuses, and non-transitory computer-readable medium described herein, transmitting the uplink random access message may include operations, features, means, or instructions for transmitting a third random access message in a first random access procedure, where the beam information includes channel state information, channel quality information, a precoding matrix indicator (PMI), an indication of a supported codebook, or a combination thereof.

In some examples of the method, apparatuses, and non-transitory computer-readable medium described herein, receiving the downlink random access message using the second beam may include operations, features, means, or instructions for receiving a fourth random access message in the first random access procedure, where the second beam includes a combination of a third beam and a fourth beam.

In some examples of the method, apparatuses, and non-transitory computer-readable medium described herein, transmitting the uplink random access message may include operations, features, means, or instructions for transmitting a negative acknowledgement message requesting a retransmission of a fourth random access message in a first random access procedure, where the beam information includes an indication of the second beam.

In some examples of the method, apparatuses, and non-transitory computer-readable medium described herein, receiving the downlink random access message using the second beam may include operations, features, means, or instructions for receiving the requested retransmission of the fourth random access message in the first random access procedure.

Some examples of the method, apparatuses, and non-transitory computer-readable medium described herein may further include operations, features, means, or instructions for identifying a first code point for transmitting an acknowledgement message to the base station, identifying a second code point for transmitting the negative acknowledgement message, the second code point associated with the second beam, and encoding the acknowledgement message and the indication of the second beam using the second code point, where transmitting the uplink random access message may be based on the encoding.

In some examples of the method, apparatuses, and non-transitory computer-readable medium described herein, transmitting the uplink random access message may include operations, features, means, or instructions for transmitting a first random access message in a second random access procedure, where the beam information includes at least one beam index associated with the second beam, an indication of a supported codebook, channel quality information, a precoding matrix indicator (PMI), or a combination thereof.

In some examples of the method, apparatuses, and non-transitory computer-readable medium described herein, receiving the downlink random access message using the second beam may include operations, features, means, or instructions for receiving a second random access message in the second random access procedure.

In some examples of the method, apparatuses, and non-transitory computer-readable medium described herein, the second beam includes a combination of a third beam and a fourth beam.

In some examples of the method, apparatuses, and non-transitory computer-readable medium described herein, transmitting the uplink random access message may include operations, features, means, or instructions for transmitting a negative acknowledgement message requesting a retransmission of a second random access message in a second random access procedure, where the beam information includes an indication of the second beam.

In some examples of the method, apparatuses, and non-transitory computer-readable medium described herein, receiving the downlink random access message using the second beam may include operations, features, means, or instructions for identifying a first code point for transmitting an acknowledgement message to the base station, identifying a second code point for transmitting the negative acknowledgement message, the second code point associated with the second beam, and encoding the acknowledgement message and the indication of the second beam using the second code point, where transmitting the uplink random access message may be based on the encoding.

Some examples of the method, apparatuses, and non-transitory computer-readable medium described herein may further include operations, features, means, or instructions for determining that a number of configured repetitions of the second random access message in the second random access procedure satisfies a threshold value, where transmitting the negative acknowledgment message may be based on determining that the number of configured repetitions satisfies the threshold value.

In some examples of the method, apparatuses, and non-transitory computer-readable medium described herein, the second random access message may be directed to only the UE.

A method of wireless communications at a base station is described. The method may include transmitting one or more synchronization signals on a set of synchronization signal resources, each synchronization signal resource of the set of synchronization signal resources associated with a beam of a set of beams, receiving, from a UE using a first beam, an uplink random access message including beam information, transmitting, based on the beam information, a downlink random access message using a second beam, and establishing a connection with the UE based on the uplink random access message and the downlink random access message.

An apparatus for wireless communications at a base station is described. The apparatus may include at least one processor, memory coupled with the at least one processor, and instructions stored in the memory. The instructions may be executable by the at least one processor to cause the apparatus to transmit one or more synchronization signals on a set of synchronization signal resources, each synchronization signal resource of the set of synchronization signal resources associated with a beam of a set of beams, receive, from a UE using a first beam, an uplink random access message including beam information, transmit, based on the beam information, a downlink random access message using a second beam, and establish a connection with the UE based on the uplink random access message and the downlink random access message.

Another apparatus for wireless communications at a base station is described. The apparatus may include means for transmitting one or more synchronization signals on a set of synchronization signal resources, each synchronization signal resource of the set of synchronization signal resources associated with a beam of a set of beams, receiving, from a UE using a first beam, an uplink random access message including beam information, transmitting, based on the beam information, a downlink random access message using a second beam, and establishing a connection with the UE based on the uplink random access message and the downlink random access message.

A non-transitory computer-readable medium storing code for wireless communications at a base station is described. The code may include instructions executable by at least one processor to transmit one or more synchronization signals on a set of synchronization signal resources, each synchronization signal resource of the set of synchronization signal resources associated with a beam of a set of beams, receive, from a UE using a first beam, an uplink random access message including beam information, transmit, based on the beam information, a downlink random access message using a second beam, and establish a connection with the UE based on the uplink random access message and the downlink random access message.

In some examples of the method, apparatuses, and non-transitory computer-readable medium described herein, receiving the uplink random access message may include operations, features, means, or instructions for receiving a third random access message in a first random access procedure, where the beam information includes at least one beam index associated with the second beam.

In some examples of the method, apparatuses, and non-transitory computer-readable medium described herein, transmitting the downlink random access message using the second beam may include operations, features, means, or instructions for transmitting a fourth random access message in the first random access procedure using the second beam.

In some examples of the method, apparatuses, and non-transitory computer-readable medium described herein, receiving the uplink random access message may include operations, features, means, or instructions for receiving a third random access message in a first random access procedure, where the beam information includes channel state information, channel quality information, a precoding matrix indicator (PMI), an indication of a supported codebook, or a combination thereof.

In some examples of the method, apparatuses, and non-transitory computer-readable medium described herein, the channel quality information includes one or more channel quality measurement values including one or more absolute measurement values, one or more offset values from a first channel quality measurement value associated with the second beam, or a combination thereof.

In some examples of the method, apparatuses, and non-transitory computer-readable medium described herein, receiving the downlink random access message using the second beam may include operations, features, means, or instructions for transmitting a fourth random access message in a first random access procedure, where the second beam includes a combination of a third beam and a fourth beam.

In some examples of the method, apparatuses, and non-transitory computer-readable medium described herein, receiving the uplink random access message may include operations, features, means, or instructions for receiving a negative acknowledgement message requesting a retransmission of a fourth random access message in a first random access procedure, where the beam information includes an indication of the second beam.

In some examples of the method, apparatuses, and non-transitory computer-readable medium described herein, transmitting the downlink random access message using the second beam may include operations, features, means, or instructions for transmitting the requested retransmission of the fourth random access message in the first random access procedure.

Some examples of the method, apparatuses, and non-transitory computer-readable medium described herein may further include operations, features, means, or instructions for decoding the negative acknowledgment message, and identifying a code point indicating the negative acknowledgement message and associated with the second beam, where transmitting the requested retransmission may be based on identifying the code point.

In some examples of the method, apparatuses, and non-transitory computer-readable medium described herein, receiving the uplink random access message may include operations, features, means, or instructions for receiving a first random access message in a second random access procedure, where the beam information includes at least one beam index associated with the second beam, an indication of a supported codebook, channel quality information, a precoding matrix indicator (PMI), or a combination thereof.

In some examples of the method, apparatuses, and non-transitory computer-readable medium described herein, transmitting the downlink random access message using the second beam may include operations, features, means, or instructions for transmitting a second random access message in the second random access procedure.

In some examples of the method, apparatuses, and non-transitory computer-readable medium described herein, the second beam includes a combination of a third beam and a fourth beam.

In some examples of the method, apparatuses, and non-transitory computer-readable medium described herein, receiving the uplink random access message may include operations, features, means, or instructions for receiving a negative acknowledgement message requesting a retransmission of a second random access message in a second random access procedure, where the beam information includes an indication of the second beam.

Some examples of the method, apparatuses, and non-transitory computer-readable medium described herein may further include operations, features, means, or instructions for decoding the negative acknowledgment message, and identifying a code point indicating the negative acknowledgement message and associated with the second beam, where transmitting the requested retransmission may be based on identifying the code point.

In some examples of the method, apparatuses, and non-transitory computer-readable medium described herein, the second random access message may be directed to only the UE.

DETAILED DESCRIPTION

Figure 1:
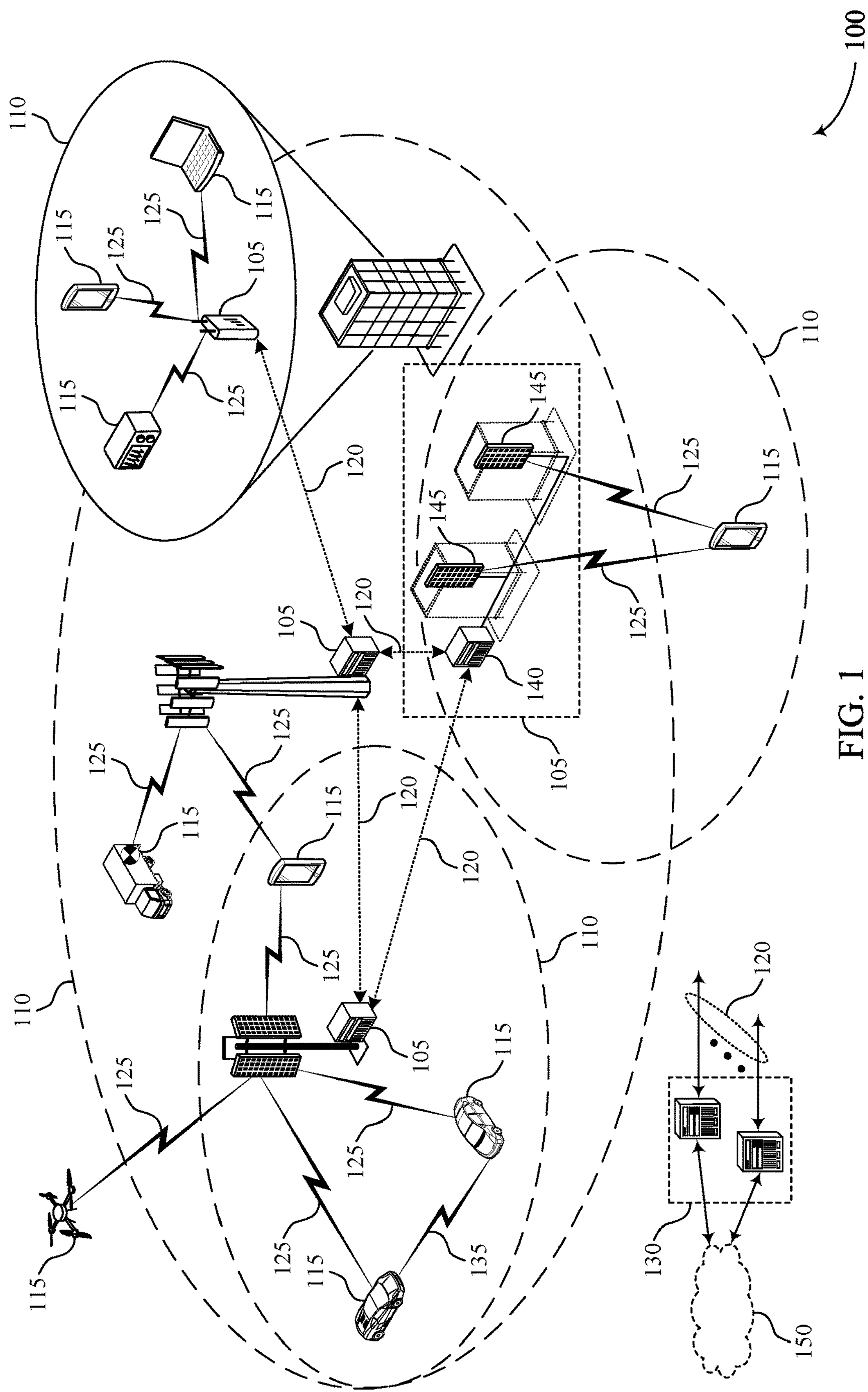
FIG. 1 illustrates an example of a system for wireless communications that supports beam changes during random access procedures in accordance with aspects of the present disclosure.

In some examples of a wireless communications system, a user equipment (UE) may establish a connection with a base station by performing random access procedure. For example, the UE may perform a two-step random access procedure or a four-step random access procedure. The UE may monitor for synchronization signal blocks (SSBs) over multiple beams and may identify a preferred beam for communicating with the base station. The UE may transmit a first random access message in the random access procedure, the random access message including an indication of the preferred beam. However, in some examples (e.g., based on a number of repetitions, failed transmissions or random access attempts), a large amount of time may pass between a first random access message (e.g., message 1 of a four-step random access procedure or message A of a two-step random access procedure) and receiving or transmitting a subsequent downlink random access message. In such examples, the previously indicated preferred beam may no longer be the best beam on which to communicate. Such a change in preferred beams over time may result in failed random access procedures, increased retransmissions of random access messages, increased system latency, or decreased system efficiency.

In some examples, a UE may indicate a beam change during a random access procedure. For instance, the UE may include a beam-change indication (e.g., an indication of a new beam) in a third random access message of a four-step random access procedure. In some examples, the UE may include beam information in the third random access message of the four-step random access procedure (e.g., generalized information such as RSRP measurements, or RSRQ measurements), which may allow the base station to select a different beam for communicating with the UE based on the beam information. In some examples, the UE may include a beam change indication in a negative acknowledgement (NACK) message associated with a fourth random access message in a four-step random access message retransmission (e.g., if a transmission of the fourth random access message is not successfully received, the UE may transmit a NACK message on a PUCCH that includes additional beam information). In some examples, a UE may include beam related information in a first message of a two-step random access procedure. In some examples, a UE may include a beam change indication in a NACK message associated with a second message of a two-step random access procedure.

Particular aspects of the subject matter described herein may be implemented to realize one or more advantages. The described techniques may support improvements in system efficiency such that a UE may provide beam information to a base station to support beam changes during random access procedures. This may allow UEs and base stations to decrease system latency, avoid system congestion, avoid failed random access procedures, or improve user experience. As such, supported techniques may include improved network operations and, in some examples, may promote device and network efficiencies, among other benefits.

Aspects of the disclosure are initially described in the context of wireless communications systems. Aspects of the disclosure are further illustrated by and described with reference to Aspects of the disclosure are further illustrated by and described with reference to apparatus diagrams, system diagrams, and flowcharts that relate to beam change indication during random access procedure.

FIG. 1 illustrates an example of a wireless communications system 100 that supports beam changes during random access procedures in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or another interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID) or a virtual cell identifier (VCID)). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

UEs 115 may be examples of smartphones (e.g., eMBB devices), ultra-reliable low latency communication (URLLC) capable devices, vehicles, or vehicle-mounted devices (e.g., vehicle-to-everything (V2X) devices). Some examples of wireless communications systems (e.g., 5G systems) may be scalable and deployable in efficient and cost-effective ways. Some examples of wireless communications system may include UEs 115 with reduced capabilities (RedCap) UEs 115, which may function under relaxed peak throughput, latency, and reliability requirements. In some examples, wireless communications systems may include UEs 115 with additional reduced capabilities that support low power wide area (LPWA) use cases. Such systems may support improvements to coverage, complexity, and power consumption at UEs 115. In some examples, UEs 115 may include, for instance, metering devices, asset tracking, or personal internet-of-things (IoT) devices.

A UE 115 may monitor synchronization signal resources, each synchronization signal resources associated with a beam, and may select a preferred beam based on the monitoring. The UE 115 may transmit an uplink random access message (e.g., message 3 of a four-step random access message, message A of a two-step random access procedure, or a negative acknowledgement (NACK) message requesting retransmission of a random access message) including beam information (e.g., one or more beam indices, channel quality information, or channel state information) to a base station 105. In response, the base station may transmit a downlink random access message (e.g., message 4 of a two-step random access message, message B of a two-step random access message, or a retransmission of a downlink random access message) using a different beam (e.g., a new preferred beam). The UE 115 may establish a connection with the base station 105 based on the completed random access procedure.

Figure 2:
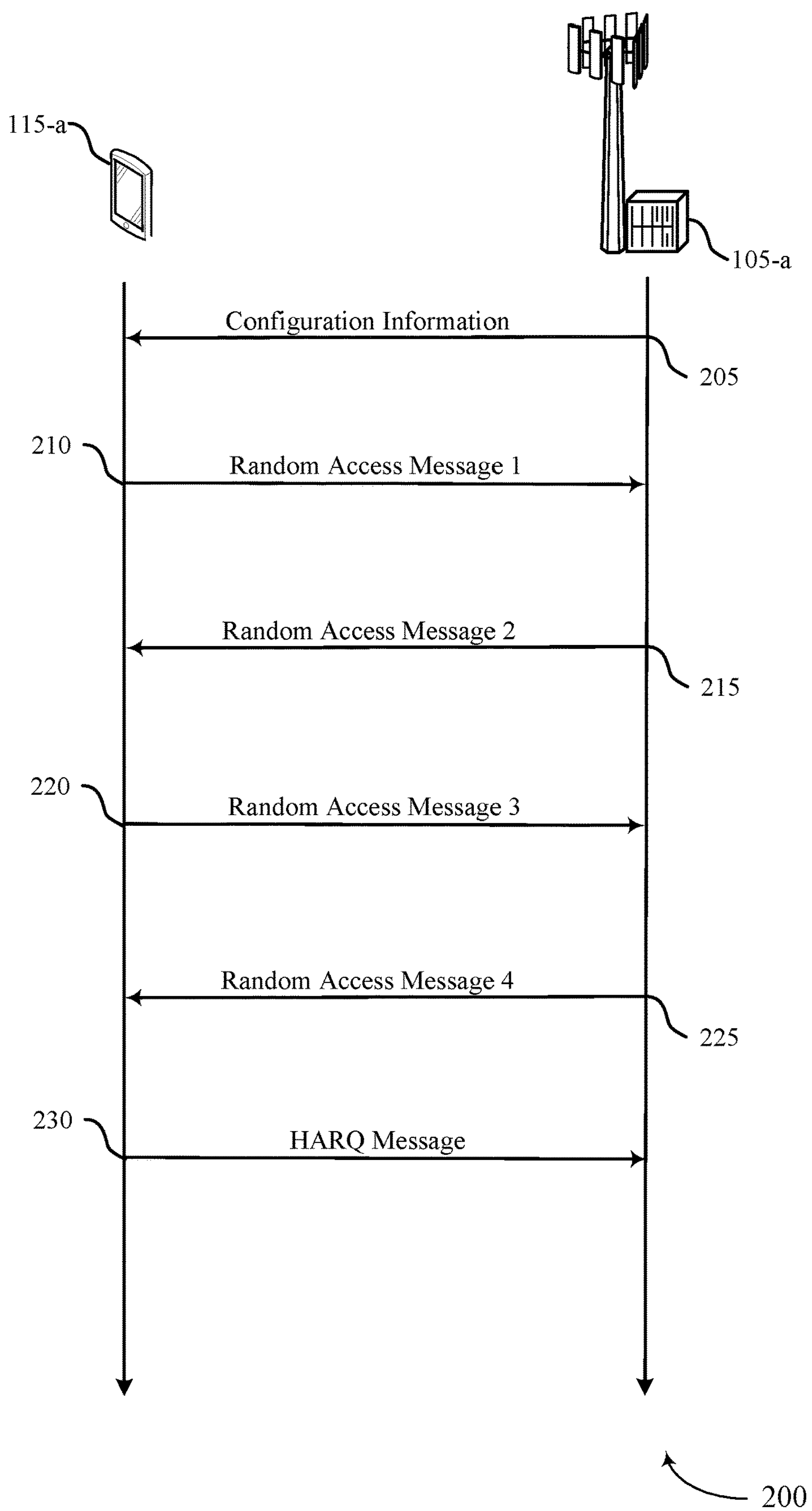
FIG. 2 illustrates an example of a process flow that supports beam changes during random access procedures in accordance with aspects of the present disclosure.

FIG. 2 illustrates an example of a process flow 200 that supports beam indications during random access procedures in accordance with aspects of the present disclosure. In some examples, process flow 200 may implement aspects of wireless communications system 100. Process flow 200 may include a UE 115-*a*, and a base station 105-*a*, which may be examples of corresponding devices described with reference to FIG. 1. UE 115-*a* may be a RedCap UE, a LPWA capable UE, a metering device, an asset tracking device, or a personal IoT device.

UE 115-*a* may establish a communication link with base station 105-*a* by using a four-step random access procedure. In such cases, UE 115-*a* may transmit at least two random access messages (e.g., random access message 1 and random access message 3) and base station 105-*a* may transmit at least two random access messages (e.g., random access message 2 and random access message 4).

At 205, base station 105-*a* may transmit configuration information to UE 115-*a*. The configuration information may include SSB configuration (e.g., including resource allocation for SSBs, timing information, or an indication of beams associated with respective SSBs), reference signal configuration information, or PRACH resource configuration. In some examples, base station 105-*a* may transmit the configuration information in system information or radio resource control (RRC) signaling. In some examples, configuration information 205 or another configuration message may include channel quality threshold information, or channel quality threshold measurement difference threshold information.

At 210, UE 115-*a* may initiate a random access procedure by transmitting random access message 1 (e.g., RACH msg 1). In some cases, random access message 1 may include a RACH preamble. In one example, the RACH preamble may carry a random access radio network temporary identifier (RA-RNTI). As shown, UE 115-*a* may transmit random access message 1 to base station 105-*a*.

In some examples, UE 115-*a* may select a beam for transmitting random access message 1 based on receiving one or more SSBs. That is, UE 115-*a* may monitor for and receive multiple SSBs, each SSB transmitted by base station 105-*a* on a different transmit beam. UE 115-*a* may select a preferred beam of the various transmit beams and may transmit random access message 1 on PRACH resources that correspond to the preferred beam. Base station 105-*a* may determine which of the beams is the preferred beam based on which PRACH resources over which base station 105-*a* receives random access message 1.

In some examples (e.g., based on a number of repetitions, failed transmissions, or random access attempts), a large amount of time may pass between a first random access message (e.g., message 1 of a four-step random access procedure) and receiving or transmitting a subsequent downlink random access message. In such examples, the previously indicated preferred beam may no longer be the best beam on which to communicate. Such a change in preferred beams over time may result in failed random access procedures, increased retransmissions of random access messages, increased system latency, or decreased system efficiency.

Upon receiving random access message 1, base station 105-*a* may decode random access message 1 (e.g., a RACH preamble) and may obtain the RA-RNTI. In some cases, the RA-RNTI may be calculated from a resource used to transmit the RACH preamble. For instance, base station 105-*a* may utilize the time and frequency allocation of the preamble resource to calculate the RA-RNTI.

At 215, base station 105-*a* may transmit random access message 2 (e.g., msg 2). Random access message 2 may include control signaling (e.g., via a physical downlink control channel (PDCCH)) and a physical uplink shared channel (PDSCH) carrying a payload with the contents of the message. Random access message 2 may include a RACH preamble response. The RACH preamble response may include information for UE 115-*a*. For example, the RACH preamble response may include an uplink grant to UE 115-*a*, a temporary cell radio network temporary identifier (TC-RNTI), a resource block (RB) assignment, and a modulation coding scheme (MCS) configuration. Additionally, base station 105-*a* may configure itself to receive random access message 3 (e.g., msg 3) using the information included in random access message 2. UE 115-*a* may receive random access message 2 and may decode random access message 2 (e.g., RACH preamble response) and obtain the information included in random access message 2. The included information may enable UE 115-*a* to transmit random access message 3 at 220.

At 220, UE 115-*a* may utilize information received in random access message 2 (e.g., the received TC-RNTI and uplink grant) to transmit a corresponding random access message 3 (e.g., on a PUSCH). Random access message 3 may include a radio RRC connection request. Base station 105-*a* may receive random access message 3 and decode random access message 3 to generate random access message 4 (e.g., msg 4) using the received information (e.g., the RRC connection request).

At 225, base station 105-*a* may transmit random access message 4 that may include an RRC connection setup corresponding to UE 115-*a* (e.g., the RRC connection setup may be associated with a TC-RNTI of UE 115-*a*). Random access message 4 may include control signaling (e.g., on a PDCCH) and data for the random access message (e.g., on a PDSCH). Random access message 4 may also include a cell radio network temporary identifier (CRNTI) for future communication with UE 115-*a*. For instance, after random access message 4, UE 115-*a* and base station 105-*a* may communicate using the CRNTI.

At 230, UE 115-*a* may transmit a hybrid automatic request (HARQ) message (e.g., an acknowledgement (ACK) message or a negative acknowledgement (NACK) message) to base station 105-*a* indicating whether UE 115-*a* successfully received random access message 4 at 225.

A UE 115-*a* may indicate, during the random access procedure, a beam change, as described in greater detail with reference to FIGS. 5-9. In some examples, a UE 115-*a* and base station 105-*a* may perform a two-step random access procedure described with reference to FIG. 3.

Figure 3:
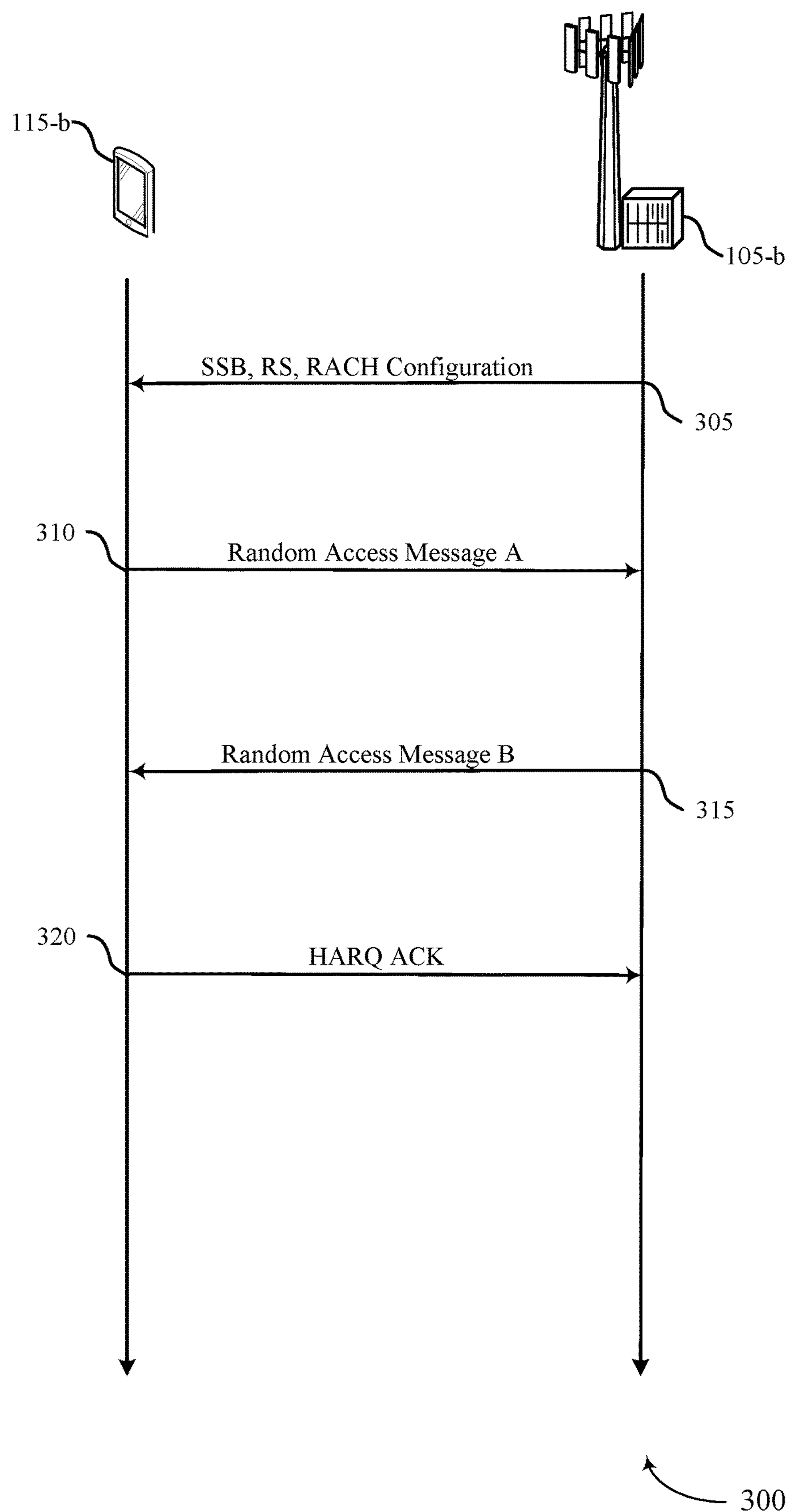
FIG. 3 illustrates an example of a process flow that supports beam changes during random access procedures in accordance with aspects of the present disclosure.

FIG. 3 illustrates an example of a process flow 300 that supports beam indications during random access procedures in accordance with aspects of the present disclosure. In some examples, process flow 300 may implement aspects of wireless communications system 100. Process flow 300 may include a UE 115-*b*, and a base station 105-*b*, which may be examples of corresponding devices described with reference to FIGS. 1 and 2. UE 115-*a* may be a RedCap UE, a LPWA capable UE, a metering device, an asset tracking device, or a personal IoT device.

UE 115-*b* may establish a communication link between UE 115-*b* and base station 105-*b* by a two-step random access procedure. In such cases, UE 115-*b* may transmit a first random access message (e.g., message A) and base station 105-*b* may transmit a second random access message (e.g., message B).

At 305, base station 105-*a* may transmit configuration information to UE 115-*a*. The configuration information may include SSB configuration (e.g., including resource allocation for SSBs, timing information, or an indication of beams associated with respective SSBs), reference signal configuration information, or PRACH configuration. In some examples, base station 105-*a* may transmit the configuration information in system information or RRC signaling. In some examples, configuration information 305 or another configuration message may include channel quality threshold information or channel quality threshold measurement difference threshold information.

At 310, UE 115-*b* may transmit a first random access message (e.g., random access message A), to base station 105-*b*. Random access message A may combine the contents of a random access message 1 and random access message 3 from a four-step random access procedure (e.g., the four-step random access procedure described with reference to FIG. 2). In some cases, random access message A may include a RACH preamble (e.g., random access message 1 from FIG. 2) and a PUSCH carrying a payload with the contents of the message (e.g., random access message 3 from FIG. 2). In some cases, the preamble and the payload of random access message A may be transmitted on separate waveforms. Random access message A may include a preamble portion (e.g., a RACH preamble as described in FIG. 2) and a payload portion (e.g., a PUSCH payload).

In some examples, UE 115-*b* may select a beam for transmitting message 1 based on receiving one or more SSBs. That is, UE 115-*b* may monitor for and receive multiple SSBs, each SSB transmitted by base station 105-*b* on a different transmit beam. UE 115-*b* may select a preferred beam of the various transmit beams and may transmit random access message A on PRACH resources that correspond to the preferred beam. Base station 105-*b* may determine which of the beams is the preferred beam based on which PRACH resources over which base station 105-*b* receives random access message 1.

In some examples (e.g., based on a number of repetitions, failed transmissions, or random access attempts), a large amount of time may pass between a first random access message (e.g., message 1 of a four-step random access procedure or message A of a two-step random access procedure) and receiving or transmitting a subsequent downlink random access message. In such examples, the previously indicated preferred beam may no longer be the best beam on which to communicate. Such a change in preferred beams over time may result in failed random access procedures, increased retransmissions of random access messages, increased system latency, or decreased system efficiency.

At 315, base station 105-*b* may transmit a random access message B. For instance, base station 105-*b* may transmit a downlink control signal (e.g., on a PDCCH) and a corresponding second random access message (e.g., random access message B) on a PDSCH to UE 115-*b*, where random access message B may combine the equivalent contents of a random access message 2 and message 4 from four-step random access procedure (e.g., random access message 2 and random access message 4 of FIG. 2). In some examples of two-step random access procedures, base station 105-*b* may transmit message B using either broadcast methods (e.g., targeting multiple UEs including UE 115-*b*) or unicast methods (e.g., targeting one or more specific UEs such as at least UE 115-*b*). Random access message B may include multiple portions or information, or both. For example, random access message B may include a preamble response portion, a contention resolution portion, an RRC connection setup message, or a combination thereof. Random access message B may also include other information provided by base station 105-*b* to UE 115-*b*, such as timing advance information.

In some examples, UE 115-*b* may select a beam for transmitting message 1 based on receiving one or more SSBs. That is, UE 115-*b* may monitor for and receive multiple SSBs, each SSB transmitted by base station 105-*b* on a different transmit beam. UE 115-*b* may select a preferred beam of the various transmit beams and may transmit random access message A on PRACH resources that correspond to the preferred beam. Base station 105-*b* may determine which of the beams is the preferred beam based on which PRACH resources over which base station 105-*b* receives random access message 1.

In some examples (e.g., based on a number of repetitions, failed transmissions, or random access attempts), a large amount of time may pass between a first random access message (e.g., message 1 of a four-step random access procedure or message A of a two-step random access procedure) and receiving or transmitting a subsequent downlink random access message. In such examples, the previously indicated preferred beam may no longer be the best beam on which to communicate. Such a change in preferred beams over time may result in failed random access procedures, increased retransmissions of random access messages, increased system latency, or decreased system efficiency.

A UE 115-*b* may indicate, during the random access procedure, a beam change, as described in greater detail with reference to FIGS. 5-9.

Figure 4:
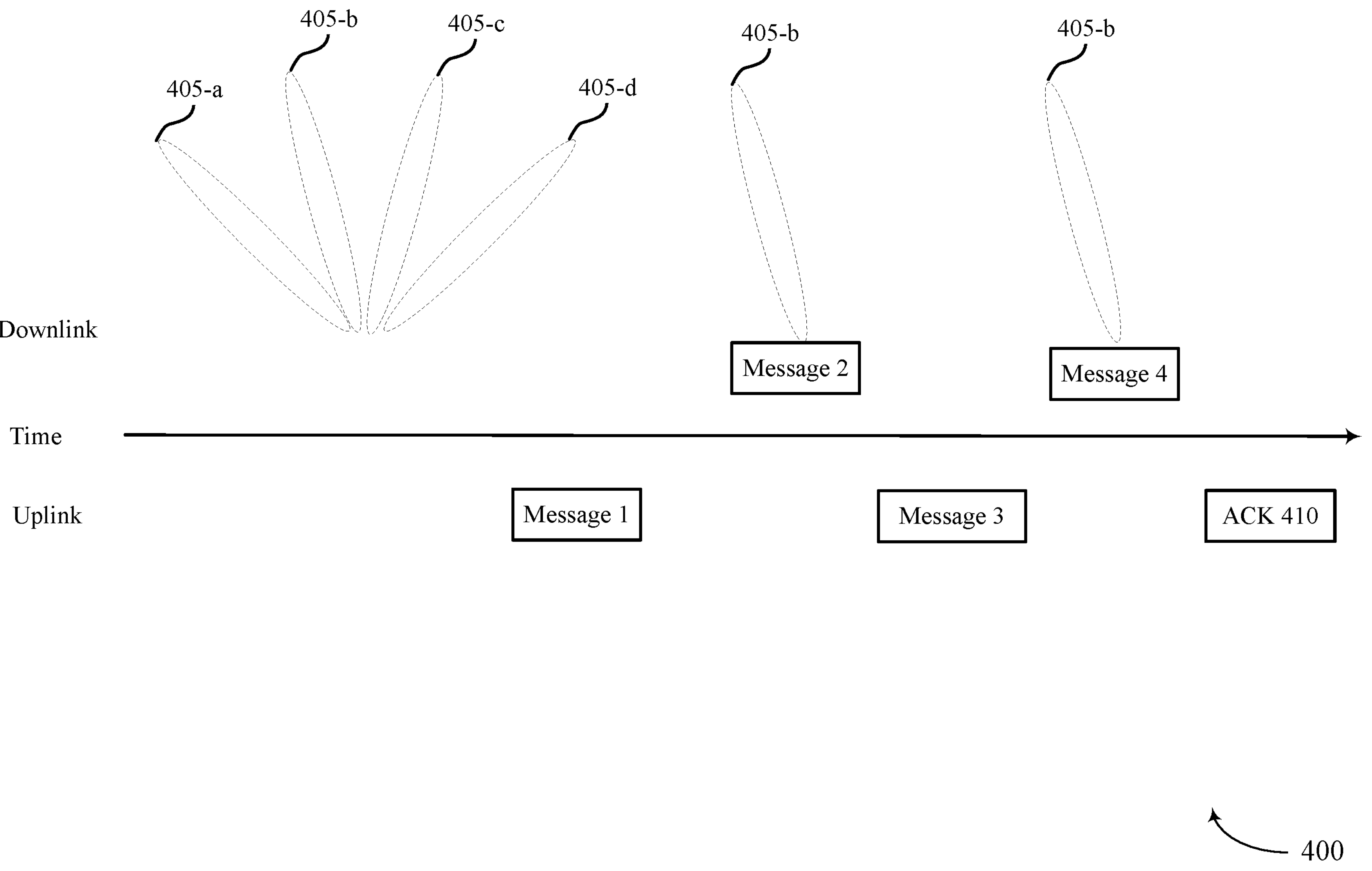
FIG. 4 illustrates an example of a timeline that supports beam changes during random access procedures in accordance with aspects of the present disclosure.

FIG. 4 illustrates an example of a timeline 400 that supports beam changes during random access procedures in accordance with aspects of the present disclosure. In some examples, timeline 400 may implement aspects of wireless communications system 100. In some examples, a base station 105 and a UE 115 may communicate with each other during timeline 400. Base station 105 and UE 115 may be examples of corresponding devices described with reference to FIGS. 1-3.

A UE 115 may initiate a random access procedure to establish a connection with a base station 105. Base station 105 may transmit one or more SSBs over one or more transmit beams 405. For instance, base station 105 may transmit SSB with an index SSB0 on beam 405-*a*, an SSB with an index SSB1 on beam 405-*b*, an SSB with an index SSB2 on beam 405-*c*, and an SSB with an index SSB 3 on beam 405-*d*. A UE 115 may monitor SSB resources for the SSBs over the various beams 405.

UE 115 may determine a preferred beam 405 from a set of beams (e.g., beam 405-*a*, beam 405-*b*, beam 405-*c*, and beam 405-*d*). For instance, UE 115 may perform one or more channel quality measurements (e.g., reference signal receive power (RSRP) or reference signal receive quality (RSRQ)) on the SSBs received over the four beams (e.g., or any other number of beams consistent with techniques described herein). UE 115 may determine which of the beams has the highest channel quality measurement value, or satisfies a threshold value. UE 115 may indicate a preferred beam to base station 105 by selecting a physical random access channel (PRACH) resource associated with the preferred beam. PRACH resources may be mapped to SSB indices (e.g., beams 405). Thus, UE 115 may transmit a first random access message (e.g., message 1 in a four-step RACH procedure or message A in a two-step RACH procedure) on a PRACH resource that is mapped to the preferred beam. For instance, as illustrated in FIG. 4, UE 115 may perform a four-step random access procedure, and may select beam 405-*b* (e.g., SSB1) as a preferred beam, and may transmit message 1 of the four-step random access procedure on PRACH resources mapped to SSB1 and beam 405-*b*.

Upon receiving message 1 on the PRACH resources associated with beam 405-*b*, base station 105 may use the same beam (e.g., beam 405-*b*) for the rest of the random access procedure. For instance, upon receiving message 1, base station 105 may transmit message 2 to UE 115 on beam 405-*b*. UE 115 may transmit message 3 to base station 105, and base station 105 may transmit message 4 on beam 405-*b*. If UE 115 successfully receives message 4 on beam 405-*b*, then UE may transmit a feedback message (e.g., a hybrid automatic repeat request (HARQ) acknowledgement (ACK) 410 or a negative acknowledgement (NACK) message). Having completed a random access procedure, UE 115 and base station 105 may establish a connection and communicate with each other.

In some examples, PDCCH and PDSCH components of message 2 and message 4 (or message B of a two-step random access procedure) may be configured with multiple repetitions (e.g., for some wireless communications systems such as NR superlight). For instance, message 2 or message 4 may be configured for up to 2,048 repetitions. The number of configured repetitions may impact a time duration of the random access procedures. That is, as time passes (e.g., based on repetitions of random access messages), one or more conditions may change. For instance, channel conditions may change, interference levels may increase or decrease on one or more beams 405, or UE 115 may be mobile and may change its location. In such cases, an initial beam selected as a preferred beam by UE 115 may change over time. For example, although UE 115 may select beam 405-*b* as a preferred beam, and may transmit message 1 on a PRACH resource that indicates beam 405-*b* as the preferred beam, by the time base station 105 transmits message 2 or message 4 beam 405-*b* may no longer be the best beam, or may not longer be serviceable for successful downlink communications. If a base station 105 and UE 115 attempt to complete a random access procedure using outdated or stale preferred beams or preferred beam information, random access procedures may fail, or a number of retransmissions may increase, which may lead to increased system latency, increased system congestion, decreased system efficiency, or increased power expenditures.

In some examples, UE 115 may provide updated beam information for a beam change during a random access procedure. For instance, UE 115 may provide an indication of a new best beam in an uplink random access message in a four-step random access procedure, as described with reference to FIG. 5. UE 115 may provide general beam information to base station 105 in an uplink random access message in a four-step random access procedure, and the base station may use the information to determine a beam change, as described with reference to FIG. 6. UE 115 may fail to receive message 4 of a four-step random access message on the previously indicated preferred beam and may include beam information in a HARQ-feedback message (e.g., NACK message), as described with reference to FIG. 7. In some examples, UE 115 may transmit beam information in a message A of a two-step random access messages, as described with reference to FIG. 8. In some examples, UE 115 may fail to receive a message B of a two-step random access message and may transmits a beam indication of a new preferred beam in a feedback message (e.g., a NACK message) as described with reference to FIG. 9.

Figure 5:
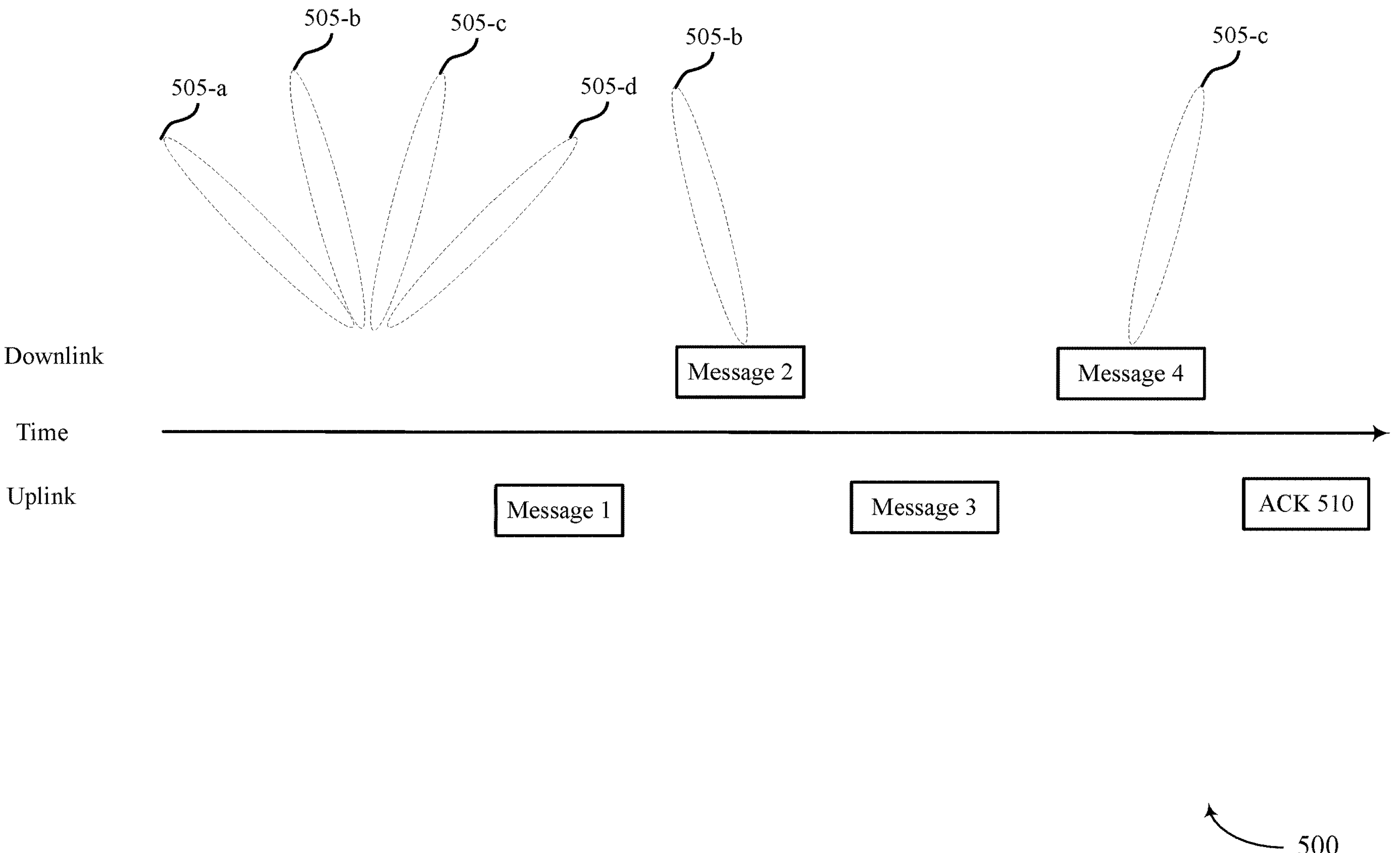
FIG. 5 illustrates an example of a timeline that supports beam changes during random access procedures in accordance with aspects of the present disclosure.

FIG. 5 illustrates an example of a timeline 500 that supports beam changes during random access procedures in accordance with aspects of the present disclosure. In some examples, timeline 500 may implement aspects of wireless communications system 100. In some examples, a base station 105 and a UE 115 may communicate with each other during timeline 500. Base station 105 and UE 115 may be examples of corresponding devices described with reference to FIGS. 1-4.

A UE 115 may initiate a random access procedure to establish a connection with a base station 105. Base station 105 may transmit one or more SSBs over one or more transmit beams 505. For instance, base station 105 may transmit SSB with an index SSB0 on beam 505-*a*, an SSB with an index SSB1 on beam 505-*b*, an SSB with an index SSB2 on beam 505-*c*, and an SSB with an index SSB 3 on beam 505-*d*. A UE 115 may monitor SSB resources for the SSBs over the various beams 505.

UE 115 may determine a preferred beam 505 from a set of beams (e.g., beam 505-*a*, beam 505-*b*, beam 505-*c*, and beam 505-*d*). For instance, UE 115 may perform one or more channel quality measurements (e.g., RSRQ or RSRP) on the SSBs received over the four beams (e.g., or any other number of beams consistent with techniques described herein). Based on the measurements, UE 115 may identify a preferred beam 505, and may transmit message 1 of a four-step random access procedure on a PRACH resource associated with the preferred beam. For instance, UE 115 may select beam 505-*b* as a preferred beam, and may transmit message 1 on a PRACH resource associated with beam 505-*b*.

Base station 105 may transmit message 2 to UE 115 on beam 505-*b* based on the PRACH resource on which it received message 1. However, message 2 and message 4 may be configured with a number of repetitions (e.g., 256 repetitions). That is, base station 105 may send up to 256 repetitions of message 2 and message 4 to UE 115 over time. The number of configured repetitions may affect a time duration between selecting a preferred beam 505 based on received SSBs and receiving, for instance, message 2 on the preferred beam 505. As a result, the preferred beam may have changed, as described with reference to FIG. 4.

UE 115 may determine, after transmitting message 1 but before transmitting message 3, that beam 505-*b* is no longer a preferred beam. UE 115 may perform new channel quality measurements, may experience and identify increased interference or decreased channel quality parameters, or may refer back to previously made channel quality measurements on the received SSBs. For instance, UE 115 may determine that downlink communications (e.g., message 2) received on beam 505-*b* do not satisfy a channel quality threshold. UE 115 may determine that beam 505-*c* is a new preferred beam (e.g., has a higher channel quality measurement value than a current channel quality measurement value of beam 505-*b*).

UE 115 may transmit message 3 of the four-step random access procedure to base station 105. UE 115 may include, in message 3, an indication of one or more new preferred beams. For instance, UE 115 may include a beam index for beam 505-*c*. In some examples, UE 115 may include a single beam index for a selected preferred beam 505 (e.g., beam

505-*c*). In some examples, UE 115 may include multiple beam indices in message 3. For instance, UE 115 may identify multiple suitable candidate beams 505 (e.g., beam 505-*c* and beam 505-*d*), and may include beam indices for each candidate beam 505 in message 3.

Base station 105 may receive message 3, and may identify the beam index, or multiple beam indices. If message 3 includes a beam index for only beam 505-*c*, then base station 105 may switch from beam 505-*b* to beam 505-*c*, and may transmit message 4 on beam 505-*c*. If message 3 includes multiple beam indices for beam 505-*c* and beam 505-*d*, then base station 105 may select one of the beams 505 (e.g., beam 505-*c*) based on scheduling considerations, available resources, or channel quality information. In such cases, base station 105 may select beam 505-*c* of the multiple candidate beams 505, and may transmit message 4 on the selected beam 505-*c*.

In some examples, UE 115 may additionally include beam information in message 3. The beam information may include, for instance, channel quality information for an indicated beam (e.g., RSRP measurements or RSRQ measurements). The channel quality measurements may be absolute measurement values, may include differential channel quality values from channel quality measurement values of a highest channel quality measurement value. For example, UE 115 may include absolute channel quality measurement values for beam 505-*c* and beam 505-*d*. Or, UE 115 may include a channel quality measurement value for beam 505-*c*, and a difference between the channel quality measurement value for beam 505-*c* and a channel quality measurement value for beam 505-*d*. In some examples, base station 105 may utilize this information to select a new preferred beam 505-*c* (e.g., from a set of candidate beams 505 indicated in message 3).

Having received message 4 on the new preferred beam 505-*c*, UE 115 may transmit an ACK 510 to base station 105.

In some examples, UE 115 may provide beam information to base station 105 (e.g., without any beam indices), as described with reference to FIG. 6.

Figure 6:
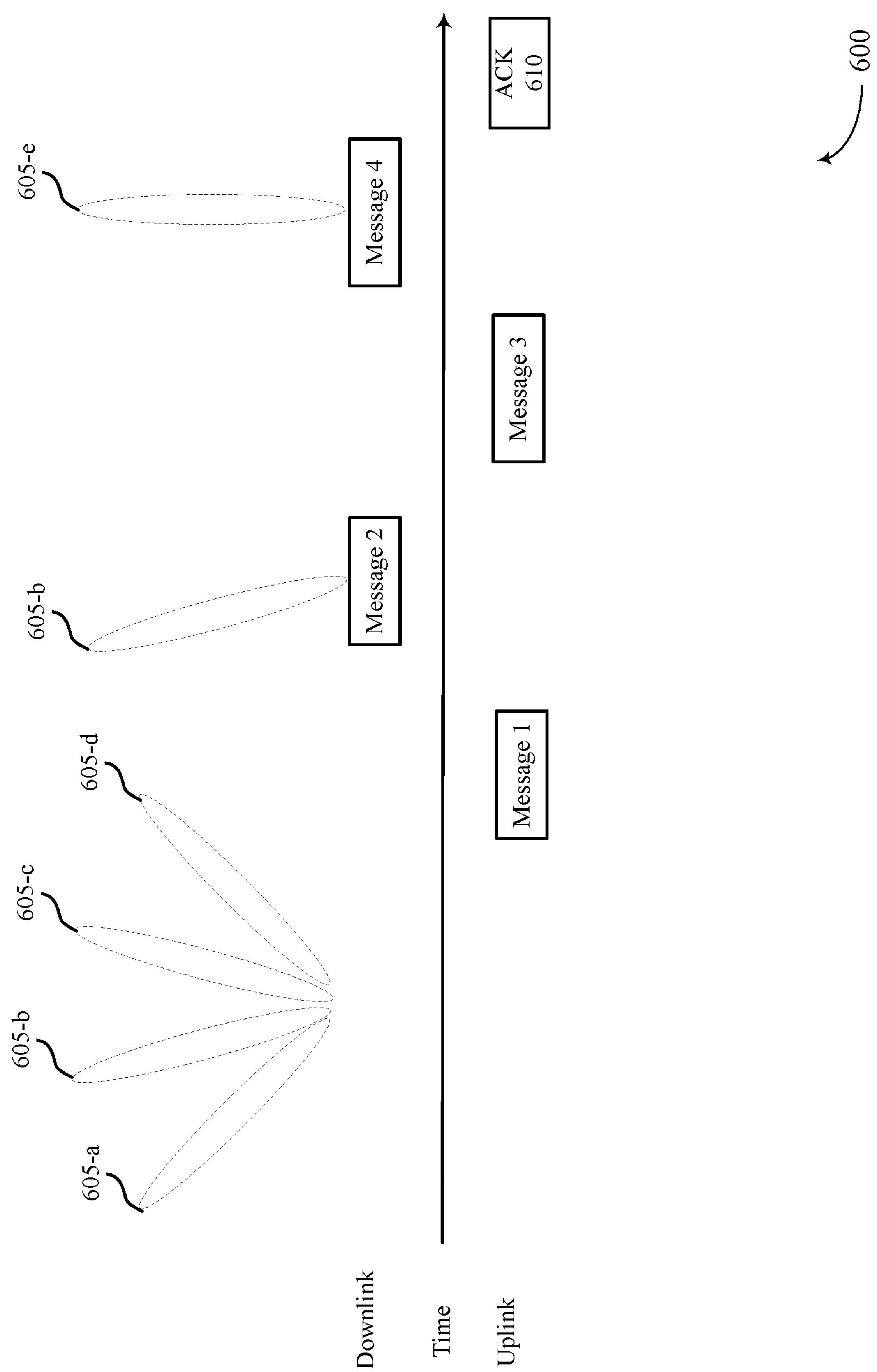
FIG. 6 illustrates an example of a timeline that supports beam changes during random access procedures in accordance with aspects of the present disclosure.

FIG. 6 illustrates an example of a timeline 600 that supports beam changes during random access procedures in accordance with aspects of the present disclosure. In some examples, timeline 600 may implement aspects of wireless communications system 100. In some examples, a base station 105 and a UE 115 may communicate with each other during timeline 600. Base station 105 and UE 115 may be examples of corresponding devices described with reference to FIGS. 1-5.

A UE 115 may initiate a random access procedure to establish a connection with a base station 105. Base station 105 may transmit one or more SSBs over one or more transmit beams 605. For instance, base station 105 may transmit SSB with an index SSB0 on beam 605-*a*, an SSB with an index SSB1 on beam 605-*b*, an SSB with an index SSB2 on beam 605-*c*, and an SSB with an index SSB 3 on beam 605-*d*. A UE 115 may monitor SSB resources for the SSBs over the various beams 605.

UE 115 may determine a preferred beam 605 from a set of beams (e.g., beam 605-*a*, beam 605-*b*, beam 605-*c*, and beam 605-*d*). For instance, UE 115 may perform one or more channel quality measurements (e.g., RSRQ or RSRP) on the SSBs received over the four beams (e.g., or any other number of beams consistent with techniques described herein). Based on the measurements, UE 115 may identify a preferred beam 605, and may transmit message 1 of a four-step random access procedure on a PRACH resource associated with the preferred beam. For instance, UE 115 may select beam 605-*b* as a preferred beam, and may transmit message 1 on a PRACH resource associated with beam 605-*b*.

Base station 105 may transmit message 2 to UE 115 on beam 605-*b* based on the PRACH resource on which it received message 1. However, message 2 and message 4 may be configured with a number of repetitions (e.g., 256 repetitions). That is, base station 105 may send up to 256 repetitions of message 2 and message 4 to UE 115 over time. The number of configured repetitions may affect a time duration between selecting a preferred beam 605 based on received SSBs and receiving, for instance, message 2 on the preferred beam 605. As a result, the preferred beam may have changed, as described with reference to FIG. 4.

UE 115 may determine, after transmitting message 1 but before transmitting message 3, that beam 605-*b* is no longer a preferred beam. UE 115 may transmit message 3 of the four-step random access procedure to base station 105. UE 115 may include, in message 3, beam information (e.g., beam-related feedback information). For instance, UE 115 may include channel state information (CSI), including channel quality information (CQI), or precoding matrix indicator (PMI) in message 3. In some examples, UE 115 may also include an indication of a supported code-book type (e.g., type-2 codebook).

Base station 105 may receive message 3, and may identify the beam information, and select a new transmit beam 605 based thereon. Base station 105 may transmit message 4 on a newly selected preferred beam 605-*e*. In some examples, (e.g., where type-2 codebook is supported for message 4), base station 105 may perform beam combining to generate beam 605-*e*. Beam 605-*e* may be a combination of any number of other beams 605. For instance, beam 605-*e* may be a combination of beam 605-*b* and beam 605-*c*.

UE 115 may receive message 4 on beam 605-*e*, and may transmit a feedback message (e.g., ACK 610) indicating that message 4 has been successfully received on the new preferred beam 605-*e*.

Figure 7:
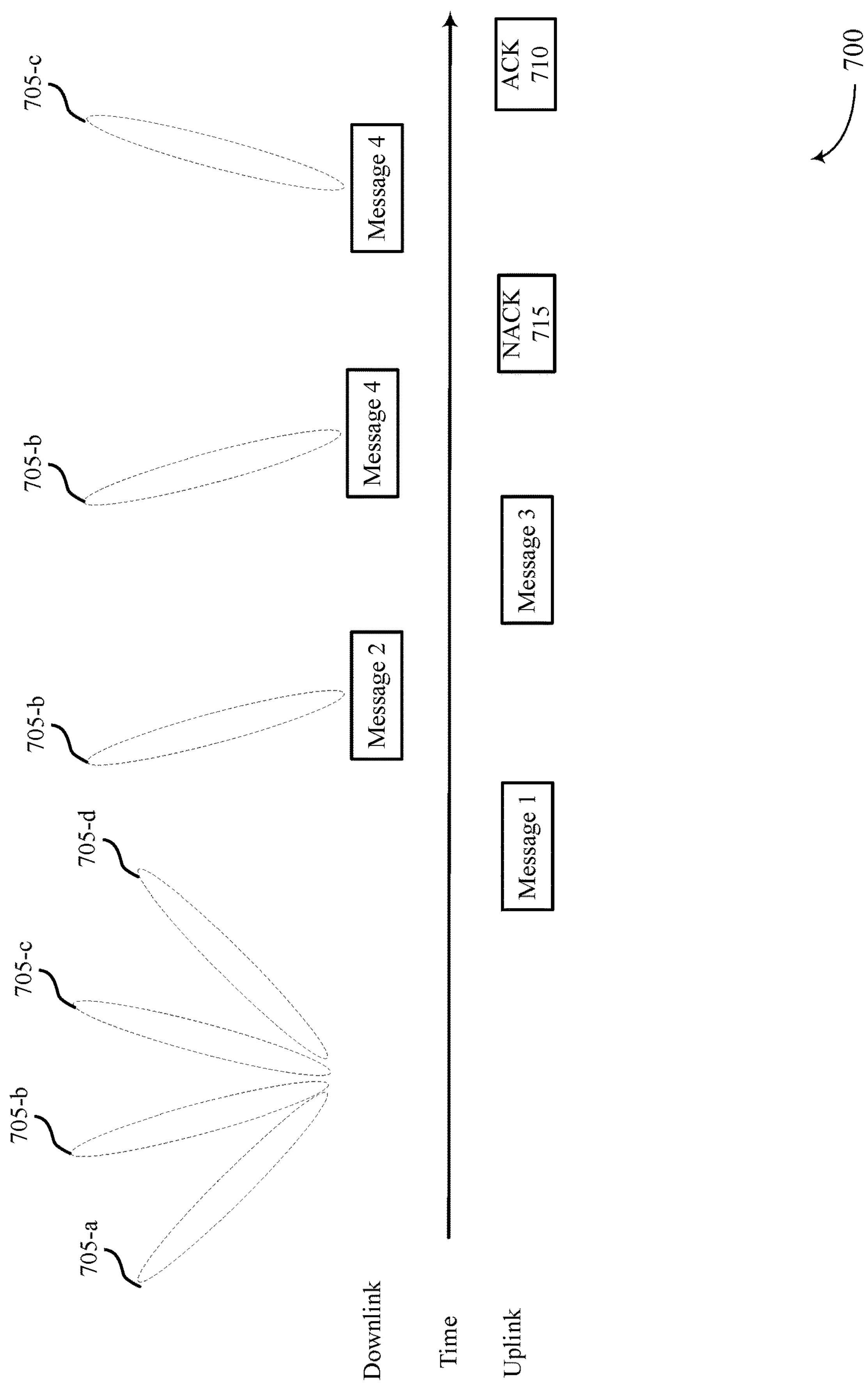
FIG. 7 illustrates an example of a timeline that supports beam changes during random access procedures in accordance with aspects of the present disclosure.

FIG. 7 illustrates an example of a timeline 700 that supports beam changes during random access procedures in accordance with aspects of the present disclosure. In some examples, timeline 700 may implement aspects of wireless communications system 100. In some examples, a base station 105 and a UE 115 may communicate with each other during timeline 700. Base station 105 and UE 115 may be examples of corresponding devices described with reference to FIGS. 1-6.

A UE 115 may initiate a random access procedure to establish a connection with a base station 105. Base station 105 may transmit one or more SSBs over one or more transmit beams 705. For instance, base station 105 may transmit SSB with an index SSB0 on beam 705-*a*, an SSB with an index SSB1 on beam 705-*b*, an SSB with an index SSB2 on beam 705-*c*, and an SSB with an index SSB 3 on beam 705-*d*. A UE 115 may monitor SSB resources for the SSBs over the various beams 705.

UE 115 may determine a preferred beam 705 from a set of beams (e.g., beam 705-*a*, beam 705-*b*, beam 705-*c*, and beam 705-*d*). For instance, UE 115 may perform one or more channel quality measurements (e.g., RSRQ or RSRP) on the SSBs received over the four beams (e.g., or any other number of beams consistent with techniques described herein). Based on the measurements, UE 115 may identify a preferred beam 705, and may transmit message 1 of a four-step random access procedure on a PRACH resource associated with the preferred beam. For instance, UE 115 may select beam 705-*b* as a preferred beam, and may transmit message 1 on a PRACH resource associated with beam 705-*b*.

Base station 105 may transmit message 2 to UE 115 on beam 705-*b* based on the PRACH resource on which it received message 1. However, message 2 and message 4 may be configured with a number of repetitions (e.g., 256 repetitions). That is, base station 105 may send up to 256 repetitions of message 2 and message 4 to UE 115 over time. The number of configured repetitions may affect a time duration between selecting a preferred beam 705 based on received SSBs and receiving, for instance, message 2 or message 4 on the preferred beam 705. As a result, the preferred beam may have changed, as described with reference to FIG. 4.

UE 115 may fail to receive message 4 successfully. For instance, UE 115 may receive message 2 on beam 705-*b*, may transmit message 3, and may monitor for message 4 on beam 705-*b*. However, given the time has passed while transmitting message 1, receiving message 2, and transmitting message 3, conditions may have changed. UE 115 may be unable to receive message 4 on beam 705-*b*. That is, a preferred beam 705 may change between initial transmission of message 4 on beam 705-*b* and retransmission of message 4. In such examples, UE 115 may determine that beam 705-*b* is no longer a preferred beam, and may select another beam 705 (e.g., beam 705-*c*) as a new preferred beam 705.

Upon determining that UE 115 has not successfully received message 4 on beam 705-*b*, UE 115 may transmit NACK 715, requesting a retransmission of message 4. UE 115 may include, in NACK 715, an indication of a new preferred beam 705 (e.g., beam 705-*c*). In some examples, UE 115 may encode the indication of the new preferred beam 705 and the NACK message in NACK 715. For instance, NACK message may include multiple code points (e.g., four code points for a two-bit indication). One code point may be reserved for an ACK message. The additional code points (e.g., the other three code points) may be reserved as indications of respective beams 705 in combination with a NACK message. That is, if UE 115 transmits a feedback message encoded with the first code point, then base station 105 may determine that UE 115 has successfully received message 4. However, if UE 115 transmits NACK 715 encoded with any of the other code points, then base station 105 may determine that message 4 has not been successfully received and may further identify a new preferred beam 705 based on the code point. For instance, for a two-bit indication, UE 115 may determine that a first code point is associated with an ACK indication, a second code point is associated with non-preferred beam 705-*a*, a third code point is associated with non-preferred beam 705-*c*, and a fourth code point is associated with non-preferred beam 705-*d*.

In some examples, discontinuous transmission (DTX) (e.g., no transmission) may indicate one code point (e.g., a NACK message and an indication that the preferred beam 705 is the same as the previous preferred beam 705-*b*). In such examples, UE 115 may transmit NACK 715, and may encode NACK 715 with the third code point.

Upon receiving NACK 715 (e.g., encoded with the third code point), base station 105 may generate a retransmission of message 4, and may send the retransmission of message 4 on the newly indicated preferred beam 705-*c* over a PUCCH.

Figure 8:
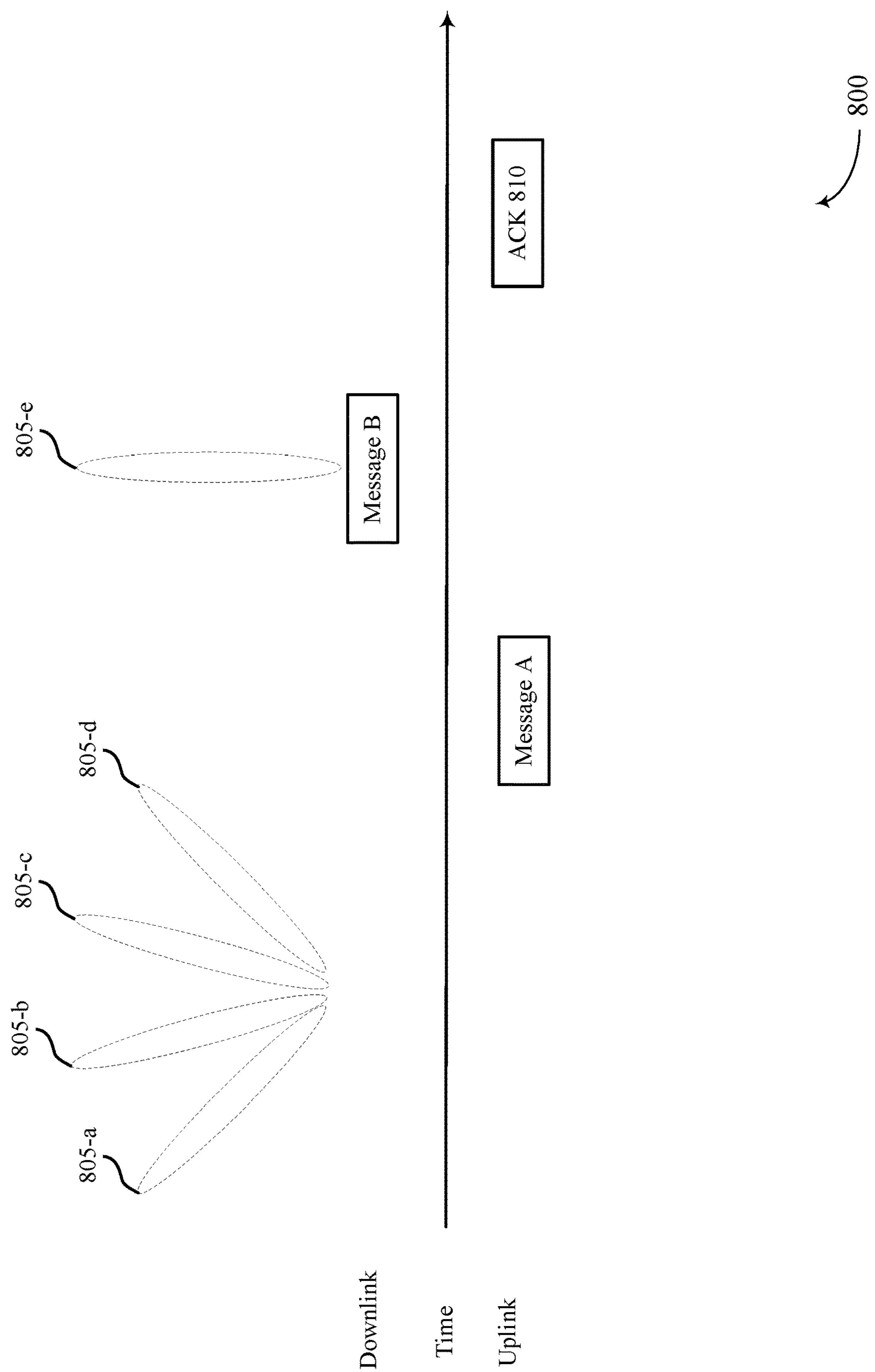
FIG. 8 illustrates an example of a timeline that supports beam changes during random access procedures in accordance with aspects of the present disclosure.

FIG. 8 illustrates an example of a timeline 800 that supports beam changes during random access procedures in accordance with aspects of the present disclosure. In some examples, timeline 800 may implement aspects of wireless communications system 100. In some examples, a base station 105 and a UE 115 may communicate with each other during timeline 800. Base station 105 and UE 115 may be examples of corresponding devices described with reference to FIGS. 1-7.

A UE 115 may initiate a random access procedure to establish a connection with a base station 105. Base station 105 may transmit one or more SSBs over one or more transmit beams 805. For instance, base station 105 may transmit SSB with an index SSB0 on beam 805-*a*, an SSB with an index SSB1 on beam 805-*b*, an SSB with an index SSB2 on beam 805-*c*, and an SSB with an index SSB 3 on beam 805-*d*. A UE 115 may monitor SSB resources for the SSBs over the various beams 805.

UE 115 may determine a preferred beam 805 from a set of beams (e.g., beam 805-*a*, beam 805-*b*, beam 805-*c*, and beam 805-*d*). For instance, UE 115 may perform one or more channel quality measurements (e.g., RSRQ or RSRP) on the SSBs received over the four beams (e.g., or any other number of beams consistent with techniques described herein). Based on the measurements, UE 115 may identify a preferred beam 805, and may transmit message A of a two-step random access procedure on a PRACH resource associated with the preferred beam. For instance, UE 115 may select beam 805-*b* as a preferred beam, and may transmit message A on a PRACH resource associated with beam 805-*b*.

In some examples, message A, message B, or both, may be configured with a number of repetitions (e.g., 256 repetitions). The number of configured repetitions may affect a time duration between selecting a preferred beam 805 based on received SSBs and receiving message B. As a result, the preferred beam 805 may have changed, as described with reference to FIG. 4.

UE 115 may transmit message A on the PRACH resources associated with a preferred beam 805-*b*. In some examples, UE 115 may include, in message A, beam information that base station 105 may use to determine a new preferred beam 805. For example, UE 115 may include beam-related feedback such as channel quality information (e.g., RSRP or RSRQ information for a new preferred beam 805, or for multiple candidate beams 805). In some examples, UE 115 may include an indication of a supported codebook type. For instance, where type-1 codebook is supported for message B, base station 105 may receive message A, and may select a new preferred beam 805-*e* for transmitting message B. In some examples, UE 115 may include, in message A, CSI (e.g., including CQI or PMI). Where type-2 codebook is supported or message B, base station 105 may perform linear combination of beams 805, and new preferred beam 805-*c* may be a combination of any number of beams 805 (e.g., a combination of beam 805-*b* and beam 805-*c*). Base station 105 may select a beam 805 or generate a combined beam 805 based on the beam information included in message A.

UE 115 may receive message B on new preferred beam 805-*e* based on including beam information in message A. Upon receiving message B, UE 15 may transmit ACK 810 to base station 105.

Figure 9:
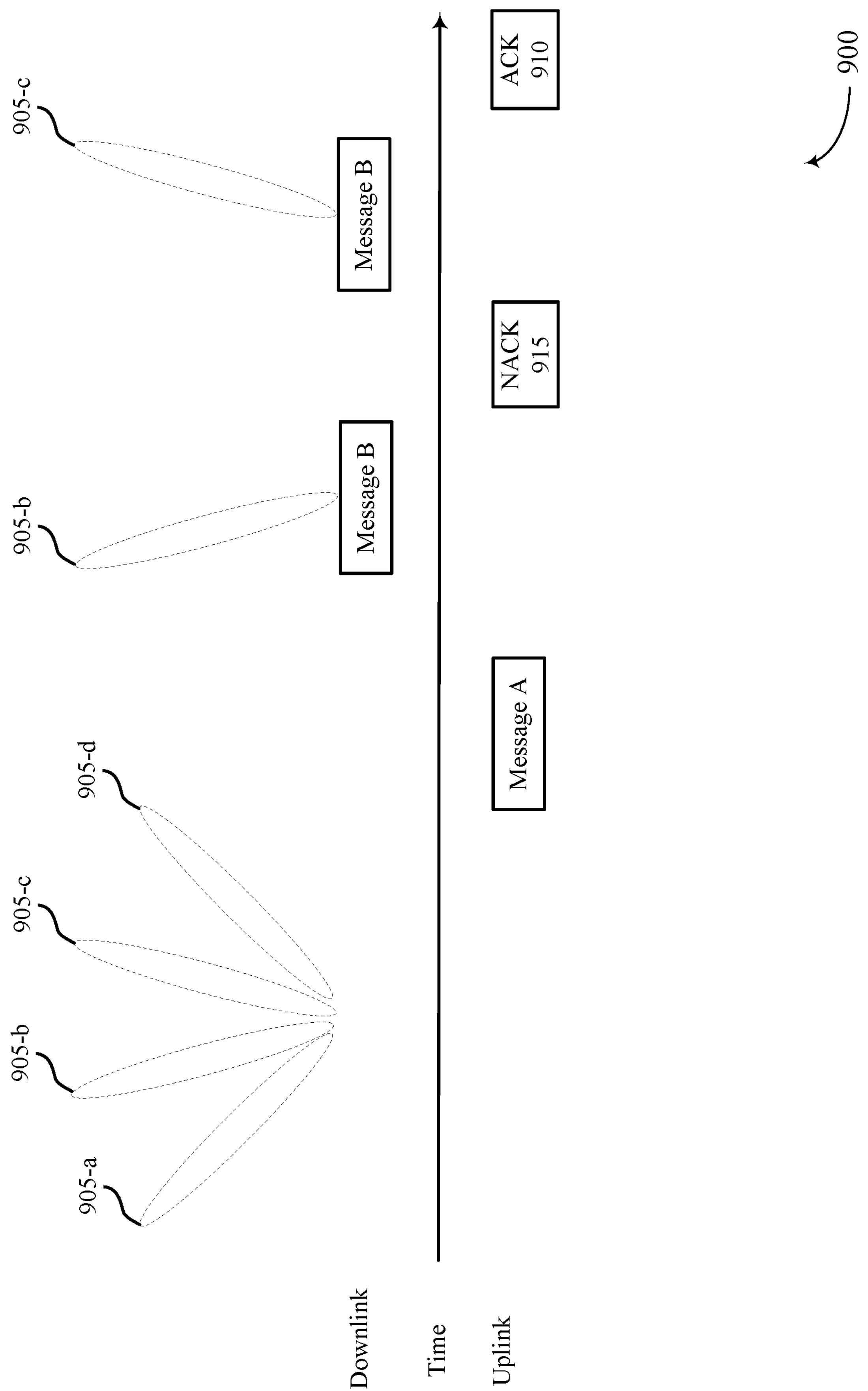
FIG. 9 illustrates an example of a timeline that supports beam changes during random access procedures in accordance with aspects of the present disclosure.

FIG. 9 illustrates an example of a timeline 900 that supports beam changes during random access procedures in accordance with aspects of the present disclosure. In some examples, timeline 900 may implement aspects of wireless communications system 100. In some examples, a base station 105 and a UE 115 may communicate with each other during timeline 900. Base station 105 and UE 115 may be examples of corresponding devices described with reference to FIGS. 1-8.

A UE 115 may initiate a random access procedure to establish a connection with a base station 105. Base station 105 may transmit one or more SSBs over one or more transmit beams 905. For instance, base station 105 may transmit SSB with an index SSB0 on beam 905-*a*, an SSB with an index SSB1 on beam 905-*b*, an SSB with an index SSB2 on beam 905-*c*, and an SSB with an index SSB 3 on beam 905-*d*. A UE 115 may monitor SSB resources for the SSBs over the various beams 905.

UE 115 may determine a preferred beam 905 from a set of beams (e.g., beam 905-*a*, beam 905-*b*, beam 905-*c*, and beam 905-*d*). For instance, UE 115 may perform one or more channel quality measurements (e.g., RSRQ or RSRP) on the SSBs received over the four beams (e.g., or any other number of beams consistent with techniques described herein). Based on the measurements, UE 115 may identify a preferred beam 905, and may transmit message A of a two-step random access procedure on a PRACH resource associated with the preferred beam. For instance, UE 115 may select beam 905-*b* as a preferred beam, and may transmit message A on a PRACH resource associated with beam 905-*b*.

Base station 105 may transmit message B to UE 115 on beam 905-*b* based on the PRACH resource on which it received message A. However, message A and message B may be configured with a number of repetitions. The number of configured repetitions may affect a time duration between selecting a preferred beam 905 based on received SSBs and receiving message B. As a result, the preferred beam 905 may have changed, as described with reference to FIG. 4. In some examples, if a number of repetitions is configured that is larger than a threshold number, UE multiplexing may not be supported for message B. Message B may be, in some examples, directed to the UE 115 (e.g., but not multiplexed to multiple UEs).

UE 115 may fail to receive message B successfully. For instance, UE 115 may receive message B on beam 905-*b*, and may monitor for message B on beam 905-*b*. However, given the time has passed while transmitting message A, conditions may have changed. UE 115 may be unable to receive message B on beam 905-*b*. That is, a preferred beam 905 may change between initial transmission of message B on beam 905-*b* and retransmission of message B. In such examples, UE 115 may determine that beam 905-*b* is no longer a preferred beam, and may select another beam 905 (e.g., beam 905-*c*) as a new preferred beam 905.

Upon determining that UE 115 has not successfully received message B on beam 905-*b*, UE 115 may transmit NACK 915, requesting a retransmission of message B. UE 115 may include, in NACK 915, an indication of a new preferred beam 905 (e.g., beam 905-*c*). In some examples, UE 115 may encode the indication of the new preferred beam 905 and the NACK message in NACK 915. For instance, NACK message may include multiple code points (e.g., four code points for a two-bit indication). One code point may be reserved for an ACK message. The additional code points (e.g., the other three code points) may be reserved as indications of respective beams 905 in combination with a NACK message. That is, if UE 115 transmits a feedback message encoded with the first code point, then base station 105 may determine that UE 115 has successfully received message B. However, if UE 115 transmits NACK 915 encoded with any of the other code points, then base station 105 may determine that message B has not been successfully received and may further identify a new preferred beam 905 based on the code point. For instance, for a two-bit indication, UE 115 may determine that a first code point is associated with an ACK indication, a second code point is associated with non-preferred beam 905-*a*, a third code point is associated with non-preferred beam 905-*c*, and a fourth code point is associated with non-preferred beam 905-*d*. In such examples, UE 115 may transmit NACK 915, and may encode NACK 915 with the third code point.

Upon receiving NACK 915 (e.g., encoded with the third code point), base station 105 may generate a retransmission of message B, and may send the retransmission of message B on the newly indicated preferred beam 905-*c* over a PUCCH. In some examples, base station 105 may not multiplex message B or the retransmission of message B or both. Instead, base station 105 may transmit the retransmission of message B with a DCI scrambled with a RA-RNTI (e.g., based on determining that a number of repetitions is higher than a threshold and UE multiplexing in message B is not supported).

Upon receiving the retransmission of message B on the new preferred beam 905-*c*, UE 115 may transmit ACK 910, indicating the successful receipt of the retransmission of message B.

Figure 10:
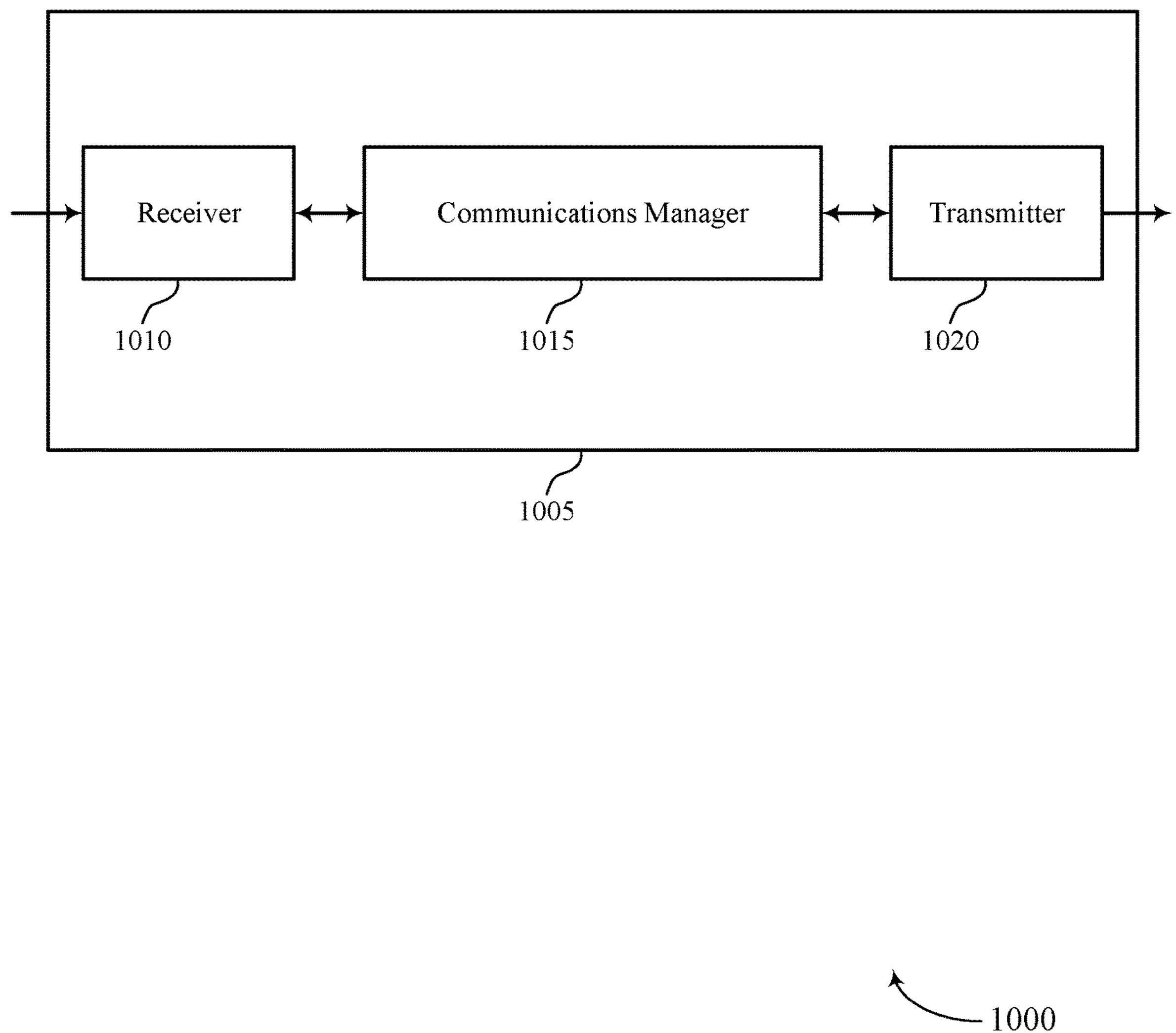
FIGS. 10 and 11 show block diagrams of devices that support beam changes during random access procedures in accordance with aspects of the present disclosure.

FIG. 10 shows a block diagram 1000 of a device 1005 that supports beam changes during random access procedures in accordance with aspects of the present disclosure. The device 1005 may be an example of aspects of a UE 115 as described herein. The device 1005 may include a receiver 1010, a communications manager 1015, and a transmitter 1020. The device 1005 may also include at least one processor. Each of these components may be in communication with one another (e.g., via one or more buses). The receiver 1010 may receive information such as packets, user data, or control information associated with various information channels (e.g., control channels, data channels, or information related to beam changes during random access procedures). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may monitor a set of synchronization signal resources, each synchronization signal resource of the set of synchronization signal resources associated with a beam of a set of beams, transmit, to a base station using a first beam, an uplink random access message including beam information, receive, based on the beam information, a downlink random access message using a second beam, and establish a connection with the base station based on the uplink random access message and the downlink random access message. The communications manager 1015 may be an example of aspects of the communications manager 1310 described herein.

The communications manager 1015, or its sub-components, may be implemented in hardware, software (e.g., executed by at least one processor), or any combination thereof. If implemented in code executed by at least one processor, the functions of the at least one communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

In some examples, the communications manager 1015 may be implemented as an integrated circuit or chipset for a mobile device modem, and the receiver 1010 and transmitter 1020 may be implemented as analog components (e.g., amplifiers, filters, antennas) coupled with the mobile device modem to enable wireless transmission and reception over one or more bands.

The communications manager 1015 as described herein may be implemented to realize one or more potential advantages. One implementation may allow for indicating beam information during a random access procedure, resulting in decreased system latency, increased likelihood of successfully completed random access procedures, improved battery life, more efficient use of computational resources, or improved reliability of communications.

Figure 13:
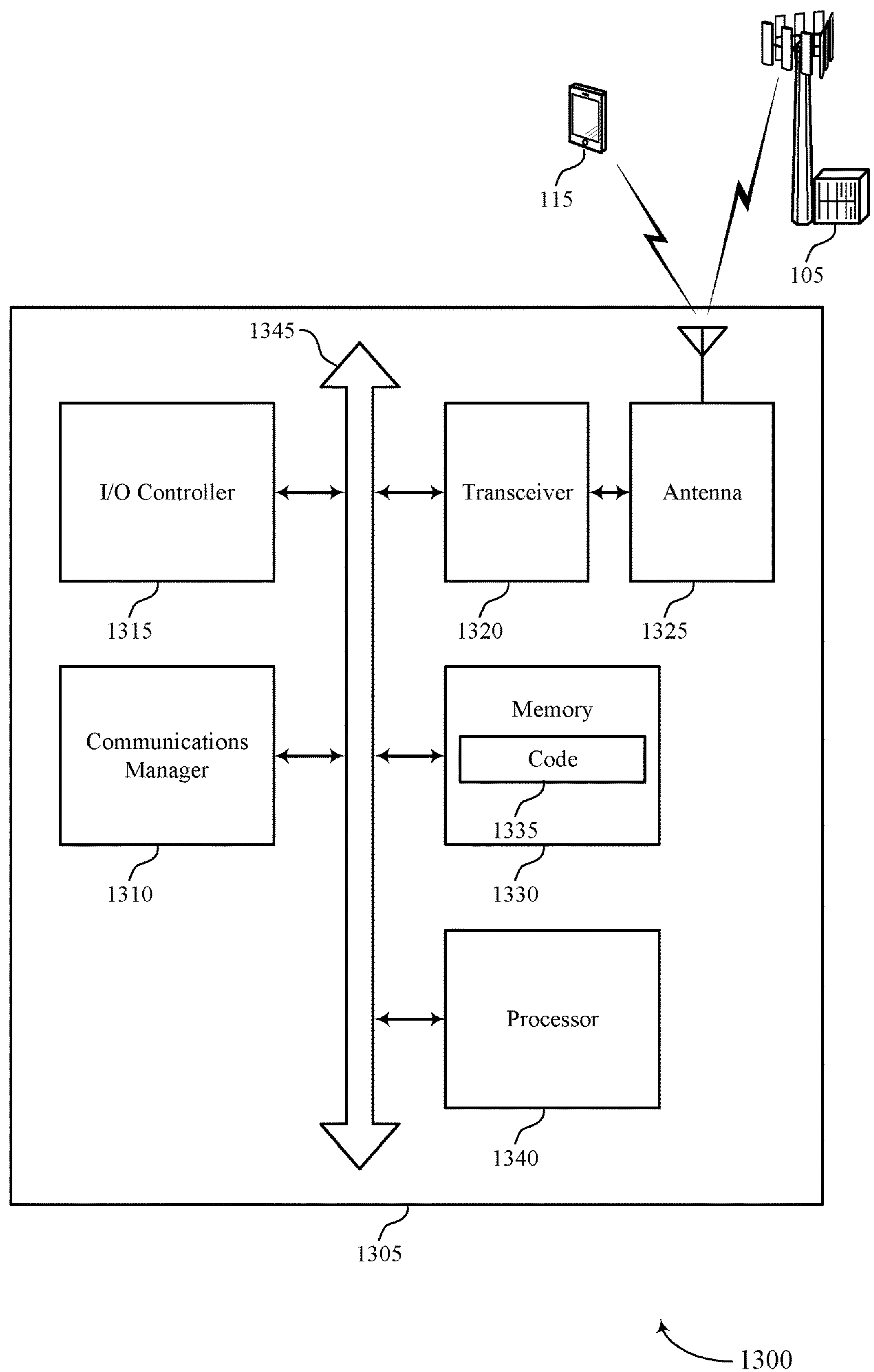
FIG. 13 shows a diagram of a system including a device that supports beam changes during random access procedures in accordance with aspects of the present disclosure.

Based on techniques for efficiently communicating maximum number of layers for a device as described herein, at least one processor of a UE 115 (e.g., controlling the receiver 1010, the transmitter 1020, or a transceiver 1320 as described with respect to FIG. 13) may increase system efficiency and decrease unnecessary processing at a device.

Figure 11:
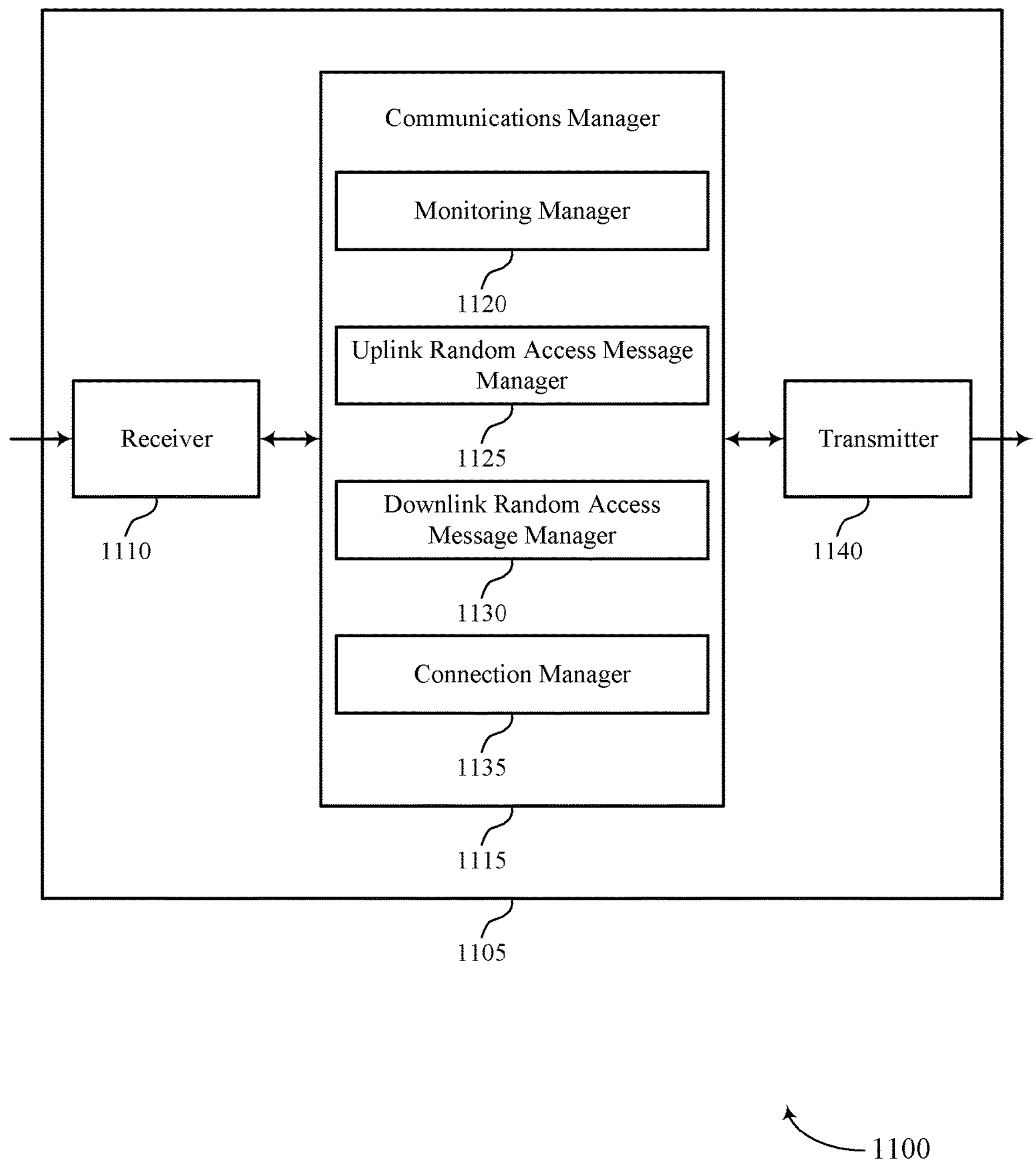

FIG. 11 shows a block diagram 1100 of a device 1105 that supports beam changes during random access procedures in accordance with aspects of the present disclosure. The device 1105 may be an example of aspects of a device 1005, or a UE 115 as described herein. The device 1105 may include a receiver 1110, a communications manager 1115, and a transmitter 1140. The device 1105 may also include at least one processor. Each of these components may be in communication with one another (e.g., via one or more buses).

The receiver 1110 may receive information such as packets, user data, or control information associated with various information channels (e.g., control channels, data channels, and information related to beam changes during random access procedures). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a monitoring manager 1120, an uplink random access message manager 1125, a downlink random access message manager 1130, and a connection manager 1135. The communications manager 1115 may be an example of aspects of the communications manager 1310 described herein.

The monitoring manager 1120 may monitor a set of synchronization signal resources, each synchronization signal resource of the set of synchronization signal resources associated with a beam of a set of beams.

The uplink random access message manager 1125 may transmit, to a base station using a first beam, an uplink random access message including beam information.

The downlink random access message manager 1130 may receive, based on the beam information, a downlink random access message using a second beam.

The connection manager 1135 may establish a connection with the base station based on the uplink random access message and the downlink random access message.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
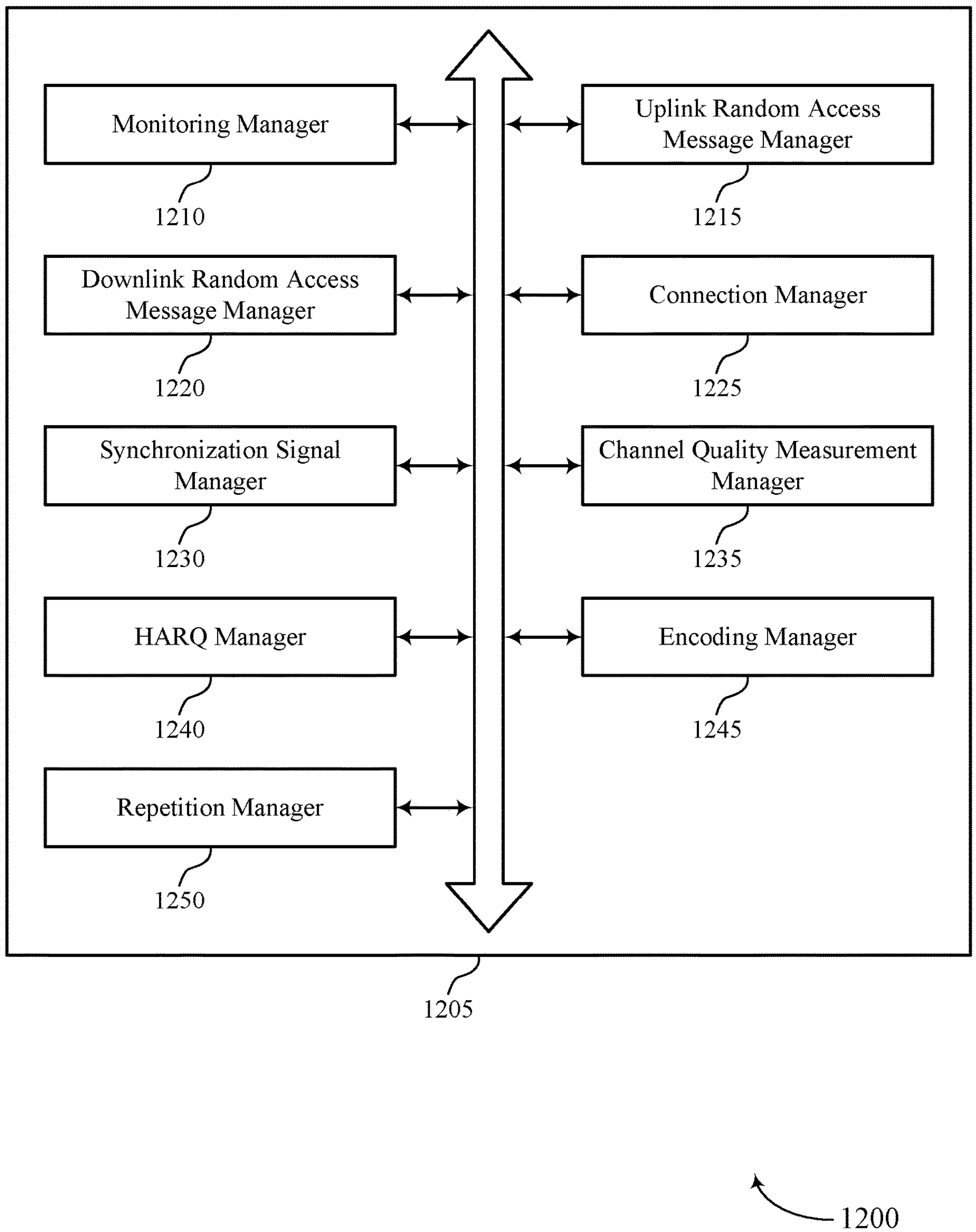
FIG. 12 shows a block diagram of a communications manager that supports beam changes during random access procedures in accordance with aspects of the present disclosure.

FIG. 12 shows a block diagram 1200 of a communications manager 1205 that supports beam changes during random access procedures in accordance with aspects of the present disclosure. The communications manager 1205 may be an example of aspects of a communications manager 1015, a communications manager 1115, or a communications manager 1310 described herein. The communications manager 1205 may include a monitoring manager 1210, an uplink random access message manager 1215, a downlink random access message manager 1220, a connection manager 1225, a synchronization signal manager 1230, a channel quality measurement manager 1235, a HARQ manager 1240, an encoding manager 1245, and a repetition manager 1250. Each of these modules may communicate, directly or indirectly, with one another (e.g., via one or more buses).

The monitoring manager 1210 may monitor a set of synchronization signal resources, each synchronization signal resource of the set of synchronization signal resources associated with a beam of a set of beams.

The uplink random access message manager 1215 may transmit, to a base station using a first beam, an uplink random access message including beam information. In some examples, the uplink random access message manager 1215 may transmit a third random access message in a first random access procedure, where the beam information includes at least one beam index associated with the second beam. In some examples, the uplink random access message manager 1215 may transmit a third random access message in a first random access procedure, where the beam information includes channel state information, channel quality information, a precoding matrix indicator (PMI), an indication of a supported codebook, or a combination thereof.

In some examples, the uplink random access message manager 1215 may transmit a first random access message in a second random access procedure, where the beam information includes at least one beam index associated with the second beam, an indication of a supported codebook, channel quality information, a precoding matrix indicator (PMI), or a combination thereof. In some examples, the uplink random access message manager 1215 may transmit a negative acknowledgement message requesting a retransmission of a second random access message in a second random access procedure, where the beam information includes an indication of the second beam. The downlink random access message manager 1220 may receive, based on the beam information, a downlink random access message using a second beam.

In some examples, the downlink random access message manager 1220 may receive a fourth random access message in the first random access procedure using the second beam. In some examples, the downlink random access message manager 1220 may receive a fourth random access message in the first random access procedure, where the second beam includes a combination of a third beam and a fourth beam. In some examples, the downlink random access message manager 1220 may receive the requested retransmission of the fourth random access message in the first random access procedure. In some examples, the downlink random access message manager 1220 may receive a second random access message in the second random access procedure. In some cases, the second beam includes a combination of a third beam and a fourth beam.

The connection manager 1225 may establish a connection with the base station based on the uplink random access message and the downlink random access message.

The synchronization signal manager 1230 may receive, based on the monitoring, one or more synchronization signals over the set of synchronization signal resources.

The channel quality measurement manager 1235 may perform one or more channel quality measurements on the one or more synchronization signals. In some examples, the channel quality measurement manager 1235 may generate, based on performing the one or more channel quality measurements, one or more channel quality measurement values, where the beam information further includes the one or more channel quality measurement values. In some cases, the one or more channel quality measurement values include one or more absolute measurement values, one or more offset values from a first channel quality measurement value associated with the second beam, or a combination thereof.

The HARQ manager 1240 may transmit a negative acknowledgement message requesting a retransmission of a fourth random access message in a first random access procedure, where the beam information includes an indication of the second beam. In some cases, the second random access message is directed to only the UE.

The encoding manager 1245 may identify a first code point for transmitting an acknowledgement message to the base station. In some examples, the encoding manager 1245 may identify a second code point for transmitting the negative acknowledgement message, the second code point associated with the second beam. In some examples, the encoding manager 1245 may encode the acknowledgement message and the indication of the second beam using the second code point, where transmitting the uplink random access message is based on the encoding.

The repetition manager 1250 may determine that a number of configured repetitions of the second random access message in the second random access procedure satisfies a threshold value, where transmitting the negative acknowledgment message is based on determining that the number of configured repetitions satisfies the threshold value.

FIG. 13 shows a diagram of a system 1300 including a device 1305 that supports beam changes during random access procedures in accordance with aspects of the present disclosure. The device 1305 may be an example of or include the components of device 1005, device 1105, or a UE 115 as described herein. The device 1305 may include components for bi-directional voice and data communications including components for transmitting and receiving communications, including a communications manager 1310, an I/O controller 1315, a transceiver 1320, an antenna 1325, memory 1330, and a processor 1340. These components may be in electronic communication via one or more buses (e.g., bus 1345).

The communications manager 1310 may monitor a set of synchronization signal resources, each synchronization signal resource of the set of synchronization signal resources associated with a beam of a set of beams, transmit, to a base station using a first beam, an uplink random access message including beam information, receive, based on the beam information, a downlink random access message using a second beam, and establish a connection with the base station based on the uplink random access message and the downlink random access message.

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOSR, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of at least one processor. In some cases, a user may interact with the device 1305 via the I/O controller 1315 or via hardware components controlled by the I/O controller 1315.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM and ROM. The memory 1330 may store computer-readable, computer-executable code 1335 including instructions that, when executed, cause the at least one processor to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting beam changes during random access procedures).

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
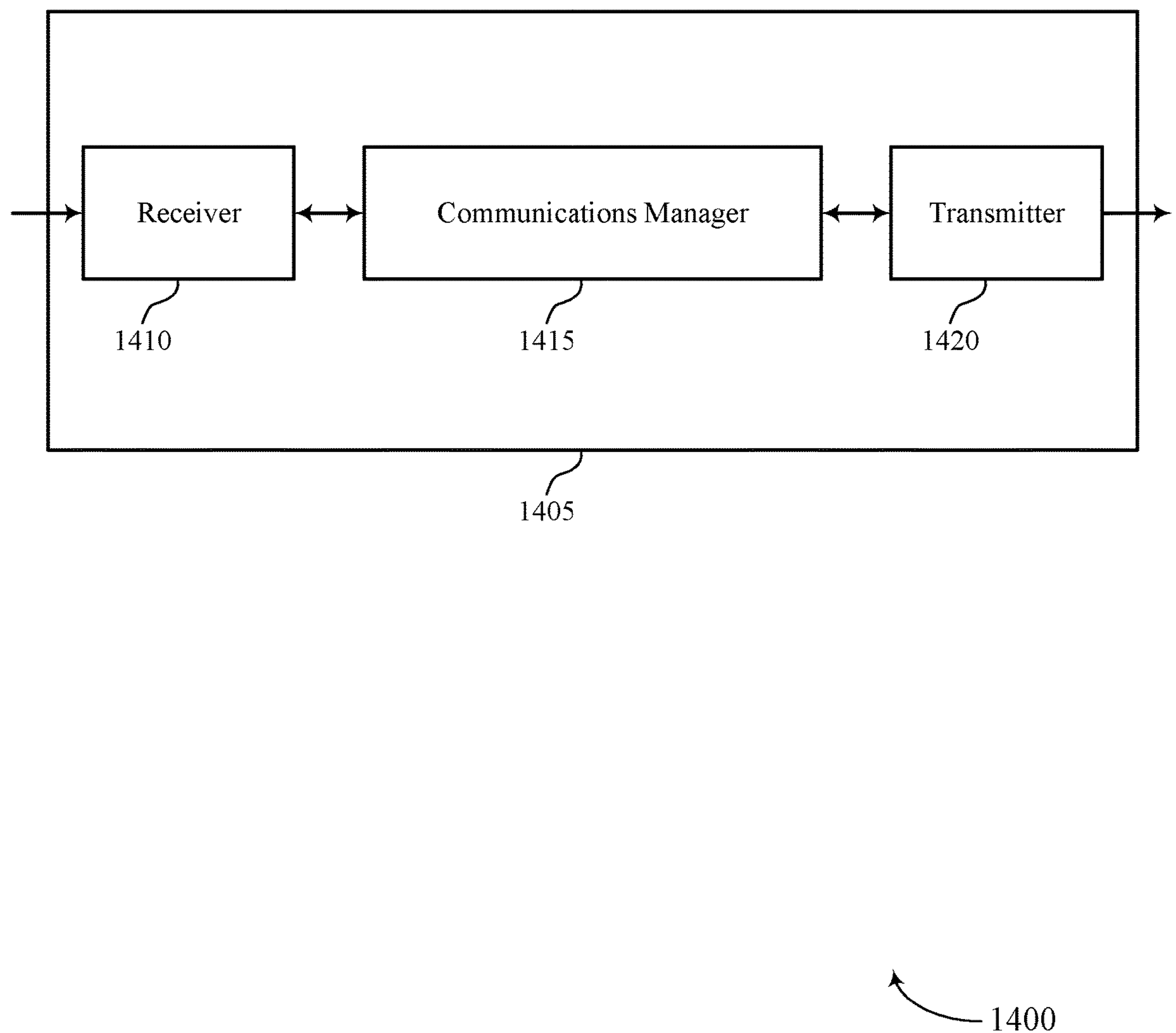
FIGS. 14 and 15 show block diagrams of devices that support beam changes during random access procedures in accordance with aspects of the present disclosure.

FIG. 14 shows a block diagram 1400 of a device 1405 that supports beam changes during random access procedures in accordance with aspects of the present disclosure. The device 1405 may be an example of aspects of a base station 105 as described herein. The device 1405 may include a receiver 1410, a communications manager 1415, and a transmitter 1420. The device 1405 may also include at least one processor. Each of these components may be in communication with one another (e.g., via one or more buses).

The receiver 1410 may receive information such as packets, user data, or control information associated with various information channels (e.g., control channels, data channels, and information related to beam changes during random access procedures). Information may be passed on to other components of the device 1405. The receiver 1410 may be an example of aspects of the transceiver 1720 described with reference to FIG. 17. The receiver 1410 may utilize a single antenna or a set of antennas.

The communications manager 1415 may transmit one or more synchronization signals on a set of synchronization signal resources, each synchronization signal resource of the set of synchronization signal resources associated with a beam of a set of beams, receive, from a UE using a first beam, an uplink random access message including beam information, transmit, based on the beam information, a downlink random access message using a second beam, and establish a connection with the UE based on the uplink random access message and the downlink random access message. The communications manager 1415 may be an example of aspects of the communications manager 1710 described herein.

The communications manager 1415, or its sub-components, may be implemented in hardware, code (e.g., software or firmware) executed by at least one processor, or any combination thereof. If implemented in code executed by at least one processor, the functions of the communications manager 1415, or its sub-components may be executed by at least one general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1415, or its sub-components, may be physically located at various positions, including being distributed such that portions of functions are implemented at different physical locations by one or more physical components. In some examples, the communications manager 1415, or its sub-components, may be a separate and distinct component in accordance with various aspects of the present disclosure. In some examples, the communications manager 1415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1420 may transmit signals generated by other components of the device 1405. In some examples, the transmitter 1420 may be collocated with a receiver 1410 in a transceiver module. For example, the transmitter 1420 may be an example of aspects of the transceiver 1720 described with reference to FIG. 17. The transmitter 1420 may utilize a single antenna or a set of antennas.

Figure 15:
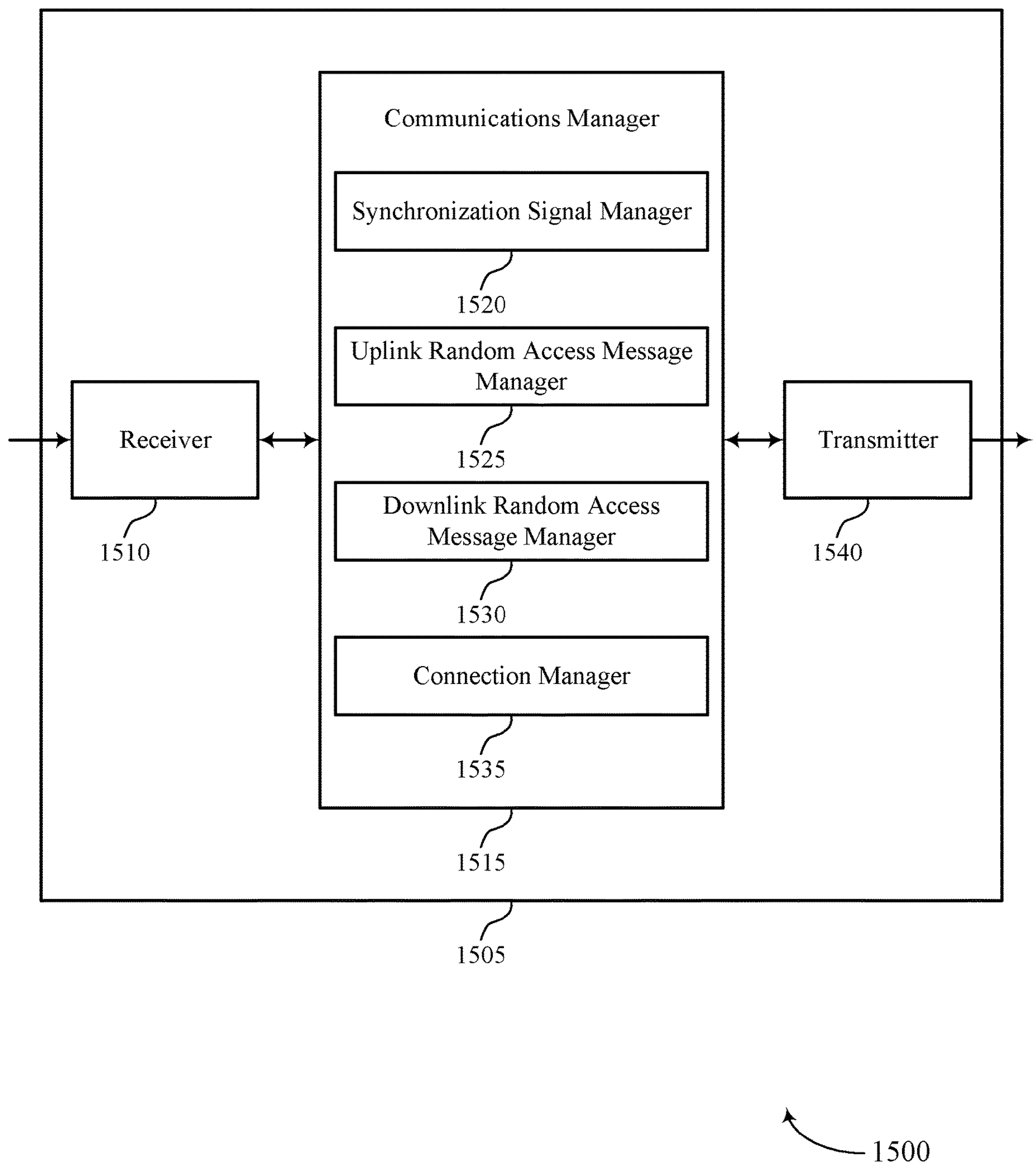

FIG. 15 shows a block diagram 1500 of a device 1505 that supports beam changes during random access procedures in accordance with aspects of the present disclosure. The device 1505 may be an example of aspects of a device 1405, or a base station 105 as described herein. The device 1505 may include a receiver 1510, a communications manager 1515, and a transmitter 1540. The device 1505 may also include at least one processor. Each of these components may be in communication with one another (e.g., via one or more buses).

The receiver 1510 may receive information such as packets, user data, or control information associated with various information channels (e.g., control channels, data channels, and information related to beam changes during random access procedures). Information may be passed on to other components of the device 1505. The receiver 1510 may be an example of aspects of the transceiver 1720 described with reference to FIG. 17. The receiver 1510 may utilize a single antenna or a set of antennas.

The communications manager 1515 may be an example of aspects of the communications manager 1415 as described herein. The communications manager 1515 may include a synchronization signal manager 1520, an uplink random access message manager 1525, a downlink random access message manager 1530, and a connection manager 1535. The communications manager 1515 may be an example of aspects of the communications manager 1710 described herein.

The synchronization signal manager 1520 may transmit one or more synchronization signals on a set of synchronization signal resources, each synchronization signal resource of the set of synchronization signal resources associated with a beam of a set of beams.

The uplink random access message manager 1525 may receive, from a UE using a first beam, an uplink random access message including beam information.

The downlink random access message manager 1530 may transmit, based on the beam information, a downlink random access message using a second beam.

The connection manager 1535 may establish a connection with the UE based on the uplink random access message and the downlink random access message.

The transmitter 1540 may transmit signals generated by other components of the device 1505. In some examples, the transmitter 1540 may be collocated with a receiver 1510 in a transceiver module. For example, the transmitter 1540 may be an example of aspects of the transceiver 1720 described with reference to FIG. 17. The transmitter 1540 may utilize a single antenna or a set of antennas.

Figure 16:
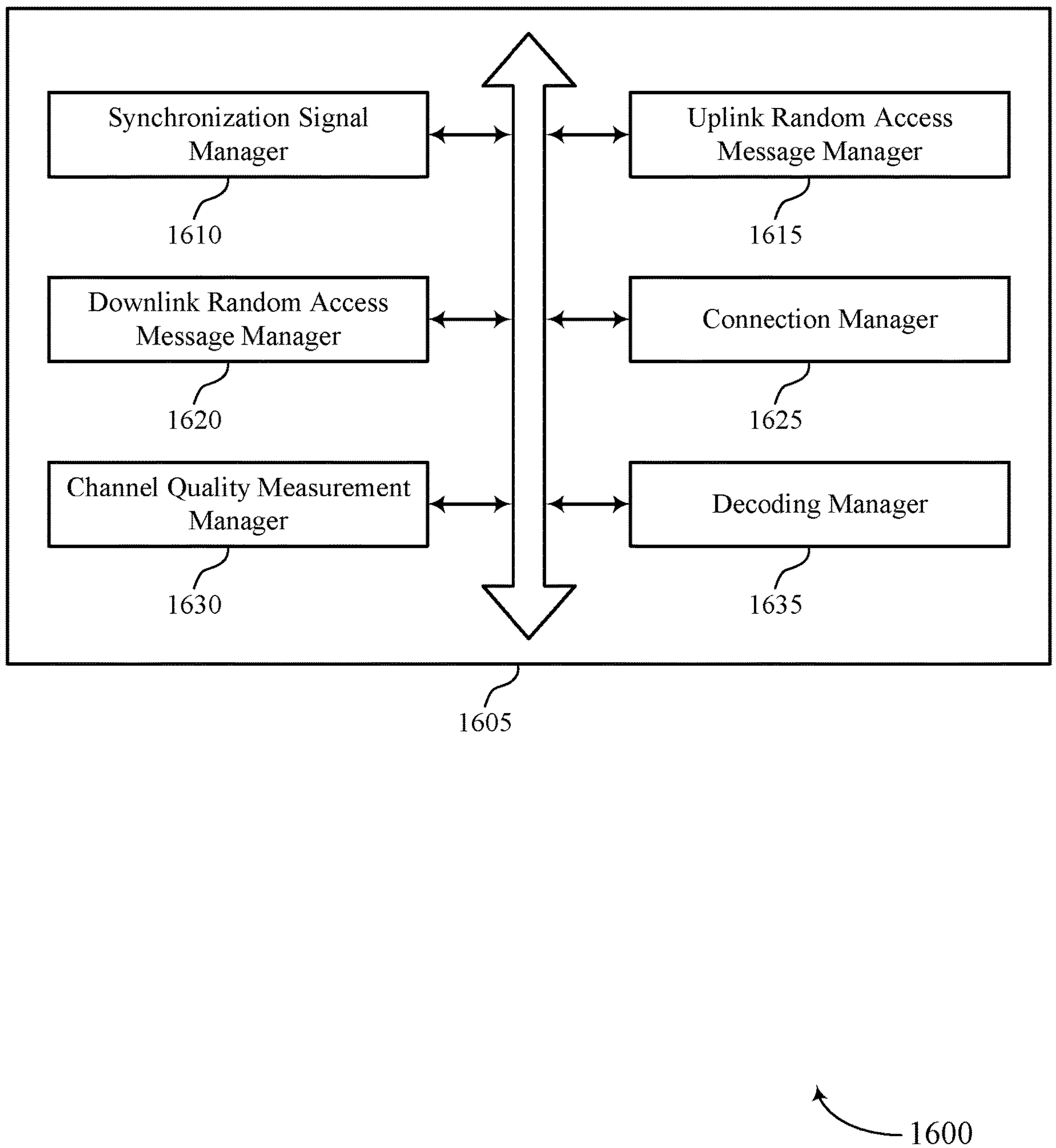
FIG. 16 shows a block diagram of a communications manager that supports beam changes during random access procedures in accordance with aspects of the present disclosure.

FIG. 16 shows a block diagram 1600 of a communications manager 1605 that supports beam changes during random access procedures in accordance with aspects of the present disclosure. The communications manager 1605 may be an example of aspects of a communications manager 1415, a communications manager 1515, or a communications manager 1710 described herein. The communications manager 1605 may include a synchronization signal manager 1610, an uplink random access message manager 1615, a downlink random access message manager 1620, a connection manager 1625, a channel quality measurement manager 1630, and a decoding manager 1635. Each of these modules may communicate, directly or indirectly, with one another (e.g., via one or more buses).

The synchronization signal manager 1610 may transmit one or more synchronization signals on a set of synchronization signal resources, each synchronization signal resource of the set of synchronization signal resources associated with a beam of a set of beams.

The uplink random access message manager 1615 may receive, from a UE using a first beam, an uplink random access message including beam information. In some examples, the uplink random access message manager 1615 may receive a third random access message in a first random access procedure, where the beam information includes at least one beam index associated with the second beam. In some examples, the uplink random access message manager 1615 may receive a third random access message in a first random access procedure, where the beam information includes channel state information, channel quality information, a precoding matrix indicator (PMI), an indication of a supported codebook, or a combination thereof. In some examples, the uplink random access message manager 1615 may receive a negative acknowledgement message requesting a retransmission of a fourth random access message in a first random access procedure, where the beam information includes an indication of the second beam.

In some examples, the uplink random access message manager 1615 may receive a first random access message in a second random access procedure, where the beam information includes at least one beam index associated with the second beam, an indication of a supported codebook, channel quality information, a precoding matrix indicator (PMI), or a combination thereof. In some examples, the uplink random access message manager 1615 may receive a negative acknowledgement message requesting a retransmission of a second random access message in a second random access procedure, where the beam information includes an indication of the second beam. In some cases, the second random access message is directed to only the UE.

The downlink random access message manager 1620 may transmit, based on the beam information, a downlink random access message using a second beam. In some examples, the downlink random access message manager 1620 may transmit a fourth random access message in the first random access procedure using the second beam. In some examples, the downlink random access message manager 1620 may transmit a fourth random access message in a first random access procedure, where the second beam includes a combination of a third beam and a fourth beam.

In some examples, the downlink random access message manager 1620 may transmit the requested retransmission of the fourth random access message in the first random access procedure. In some examples, the downlink random access message manager 1620 may transmit a second random access message in the second random access procedure. In some cases, the second beam includes a combination of a third beam and a fourth beam.

The connection manager 1625 may establish a connection with the UE based on the uplink random access message and the downlink random access message. In some cases, the channel quality information includes one or more channel quality measurement values including one or more absolute measurement values, one or more offset values from a first channel quality measurement value associated with the second beam, or a combination thereof.

The decoding manager 1635 may decode the negative acknowledgment message. In some examples, the decoding manager 1635 may identify a code point indicating the negative acknowledgement message and associated with the second beam, where transmitting the requested retransmission is based on identifying the code point.

Figure 17:
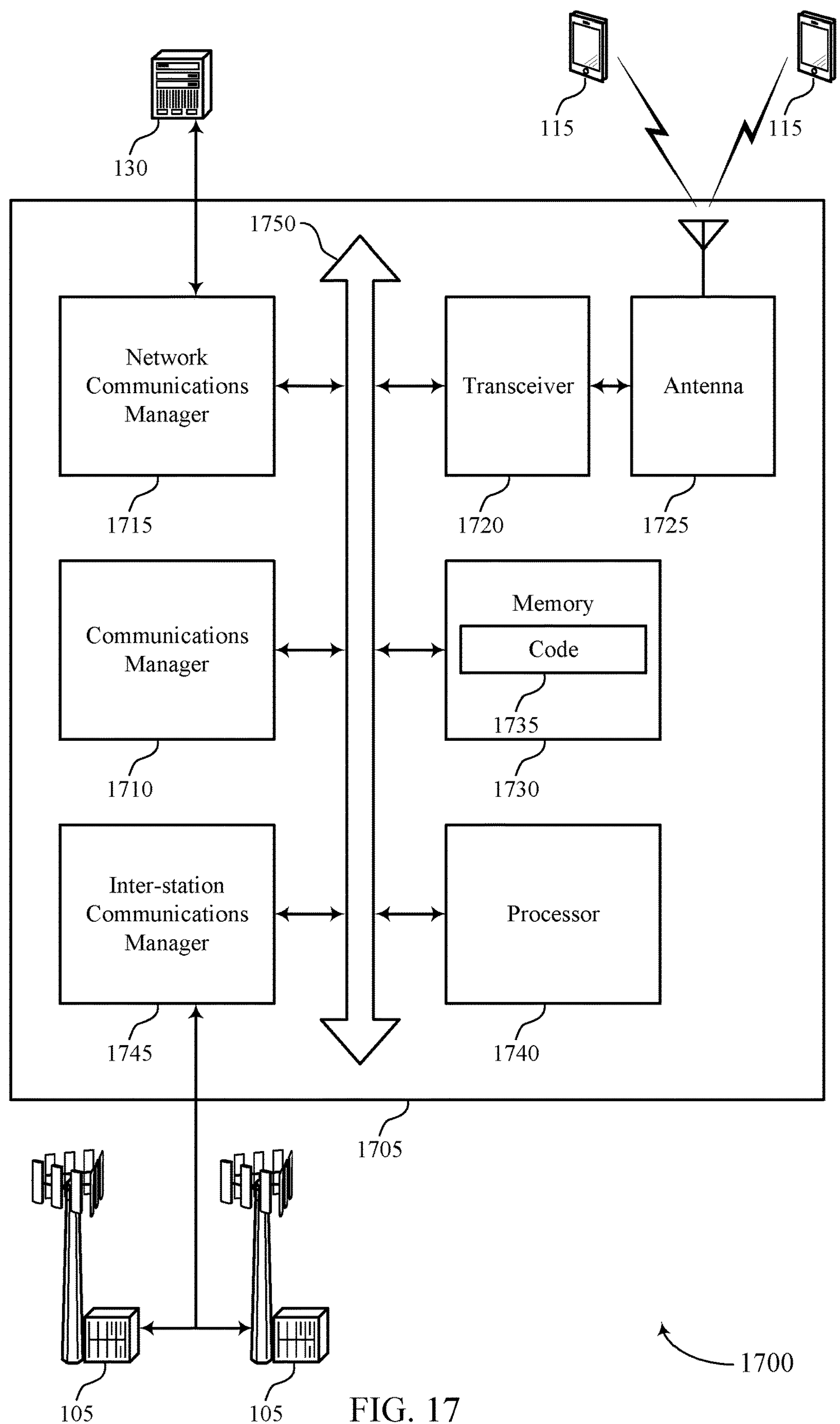
FIG. 17 shows a diagram of a system including a device that supports beam changes during random access procedures in accordance with aspects of the present disclosure.

FIG. 17 shows a diagram of a system 1700 including a device 1705 that supports beam changes during random access procedures in accordance with aspects of the present disclosure. The device 1705 may be an example of or include the components of device 1405, device 1505, or a base station 105 as described herein. The device 1705 may include components for bi-directional voice and data communications including components for transmitting and receiving communications, including a communications manager 1710, a network communications manager 1715, a transceiver 1720, an antenna 1725, memory 1730, a processor 1740, and an inter-station communications manager 1745. These components may be in electronic communication via one or more buses (e.g., bus 1750).

The communications manager 1710 may transmit one or more synchronization signals on a set of synchronization signal resources, each synchronization signal resource of the set of synchronization signal resources associated with a beam of a set of beams, receive, from a UE using a first beam, an uplink random access message including beam information, transmit, based on the beam information, a downlink random access message using a second beam, and establish a connection with the UE based on the uplink random access message and the downlink random access message.

The network communications manager 1715 may manage communications with the core network (e.g., via one or more wired backhaul links). For example, the network communications manager 1715 may manage the transfer of data communications for client devices, such as one or more UEs 115.

The transceiver 1720 may communicate bi-directionally, via one or more antennas, wired, or wireless links as described herein. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas.

In some cases, the wireless device may include a single antenna 1725. However, in some cases the device may have more than one antenna 1725, which may be capable of concurrently transmitting or receiving multiple wireless transmissions.

The memory 1730 may include RAM, ROM, or a combination thereof. The memory 1730 may store computer-readable code 1735 including instructions that, when executed by at least one processor (e.g., the processor 1740) cause the device to perform various functions described herein. In some cases, the memory 1730 may contain, among other things, a BIOS which may control basic hardware or software operation such as the interaction with peripheral components or devices.

The processor 1740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some cases, a memory controller may be integrated into processor 1740. The processor 1740 may be configured to execute computer-readable instructions stored in a memory (e.g., the memory 1730) to cause the device 1705 to perform various functions (e.g., functions or tasks supporting beam changes during random access procedures).

The inter-station communications manager 1745 may manage communications with other base station 105 and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communication network technology to provide communication between base stations 105.

The code 1735 may include instructions to implement aspects of the present disclosure, including instructions to support wireless communications. The code 1735 may be stored in a non-transitory computer-readable medium such as system memory or other type of memory. In some cases, the code 1735 may not be directly executable by the processor 1740 but may cause a computer (e.g., when compiled and executed) to perform functions described herein.

Figure 18:
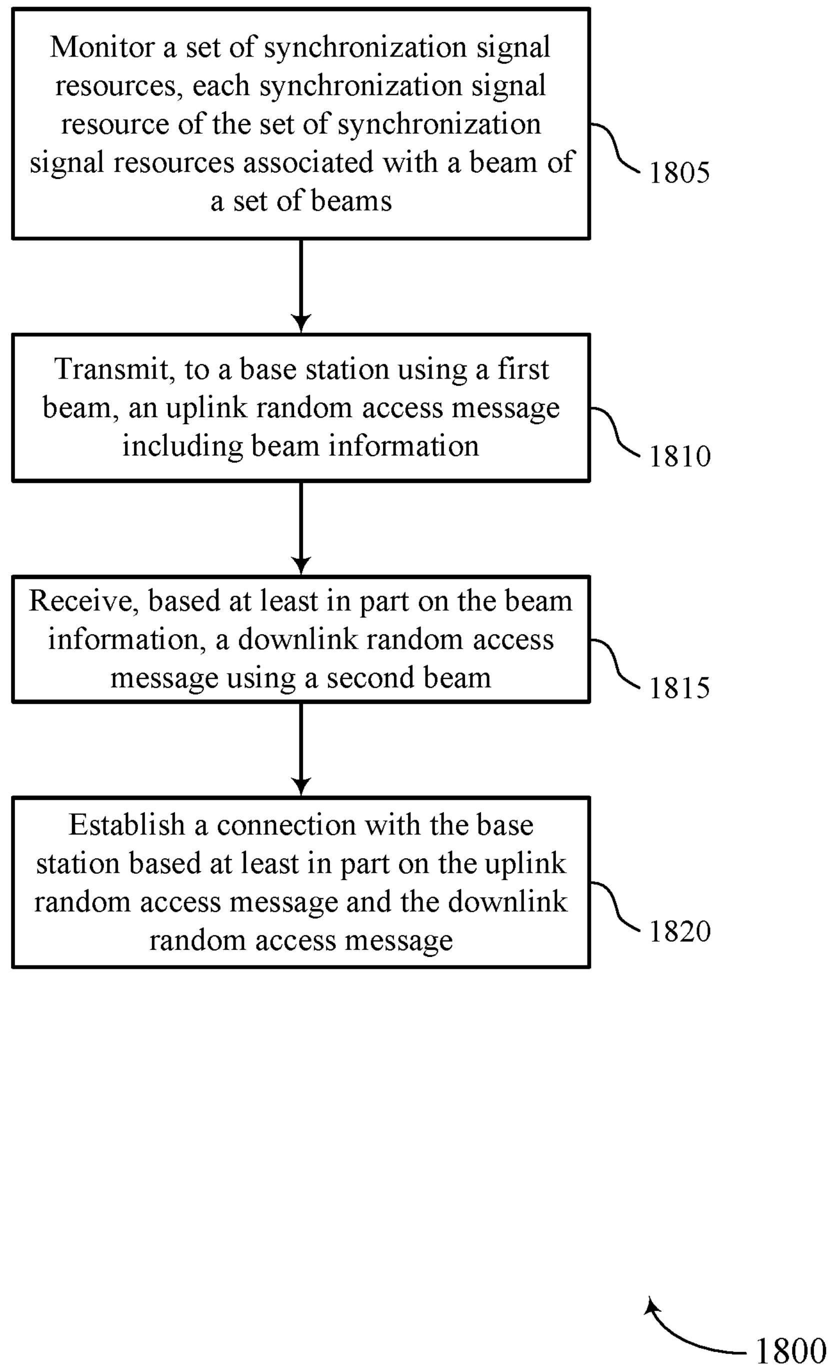
FIGS. 18 and 19 show flowcharts illustrating methods that support beam changes during random access procedures in accordance with aspects of the present disclosure.

FIG. 18 shows a flowchart illustrating a method 1800 that supports beam changes during random access procedures in accordance with aspects of the present disclosure. The operations of method 1800 may be implemented by a UE 115 or its components as described herein. For example, the operations of method 1800 may be performed by a communications manager as described with reference to FIGS. 10 through 13. In some examples, a UE may execute a set of instructions to control the functional elements of the UE to perform the functions described herein. Additionally, or alternatively, a UE may perform aspects of the functions described herein using special-purpose hardware.

At 1805, the UE may monitor a set of synchronization signal resources, each synchronization signal resource of the set of synchronization signal resources associated with a beam of a set of beams. The operations of 1805 may be performed according to the methods described herein. In some examples, aspects of the operations of 1805 may be performed by a monitoring manager as described with reference to FIGS. 10 through 13.

At 1810, the UE may transmit, to a base station using a first beam, an uplink random access message including beam information. The operations of 1810 may be performed according to the methods described herein. In some examples, aspects of the operations of 1810 may be performed by an uplink random access message manager as described with reference to FIGS. 10 through 13.

At 1815, the UE may receive, based at least in part on the beam information, a downlink random access message using a second beam. The operations of 1815 may be performed according to the methods described herein. In some examples, aspects of the operations of 1815 may be performed by a downlink random access message manager as described with reference to FIGS. 10 through 13.

At 1820, the UE may establish a connection with the base station based at least in part on the uplink random access message and the downlink random access message. The operations of 1820 may be performed according to the methods described herein. In some examples, aspects of the operations of 1820 may be performed by a connection manager as described with reference to FIGS. 10 through 13.

Figure 19:
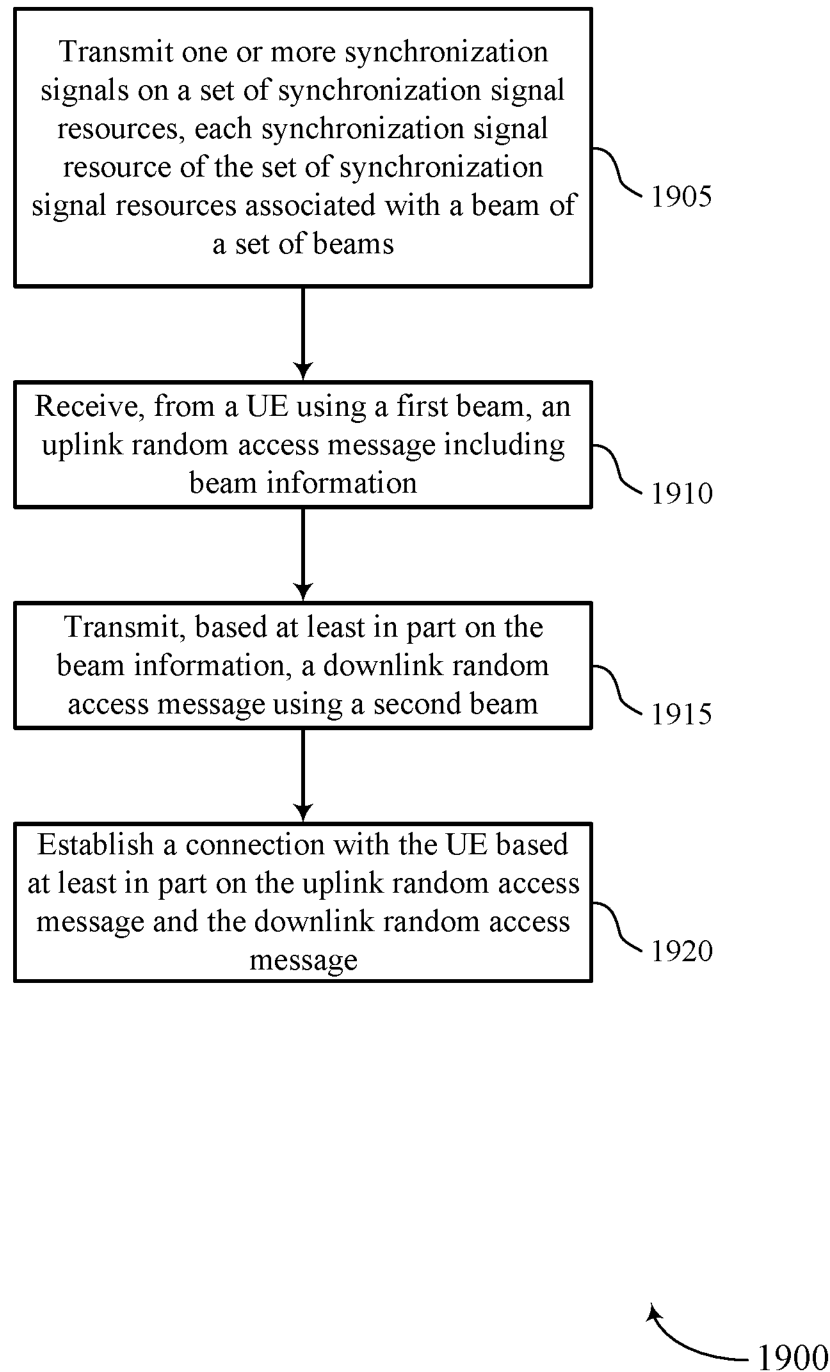

FIG. 19 shows a flowchart illustrating a method 1900 that supports beam changes during random access procedures in accordance with aspects of the present disclosure. The operations of method 1900 may be implemented by a base station 105 or its components as described herein. For example, the operations of method 1900 may be performed by a communications manager as described with reference to FIGS. 14 through 17. In some examples, a base station may execute a set of instructions to control the functional elements of the base station to perform the functions described herein. Additionally, or alternatively, a base station may perform aspects of the functions described herein using special-purpose hardware.

At 1905, the base station may transmit one or more synchronization signals on a set of synchronization signal resources, each synchronization signal resource of the set of synchronization signal resources associated with a beam of a set of beams. The operations of 1905 may be performed according to the methods described herein. In some examples, aspects of the operations of 1905 may be performed by a synchronization signal manager as described with reference to FIGS. 14 through 17.

At 1910, the base station may receive, from a UE using a first beam, an uplink random access message including beam information. The operations of 1910 may be performed according to the methods described herein. In some examples, aspects of the operations of 1910 may be performed by an uplink random access message manager as described with reference to FIGS. 14 through 17.

At 1915, the base station may transmit, based at least in part on the beam information, a downlink random access message using a second beam. The operations of 1915 may be performed according to the methods described herein. In some examples, aspects of the operations of 1915 may be performed by a downlink random access message manager as described with reference to FIGS. 14 through 17.

At 1920, the base station may establish a connection with the UE based at least in part on the uplink random access message and the downlink random access message. The operations of 1920 may be performed according to the methods described herein. In some examples, aspects of the operations of 1920 may be performed by a connection manager as described with reference to FIGS. 14 through 17.

The following provides an overview of aspects of the present disclosure:

Aspect 1: A method for wireless communications at a UE, comprising: monitoring a plurality of synchronization signal resources, each synchronization signal resource of the plurality of synchronization signal resources associated with a beam of a set of beams; transmitting, to a base station using a first beam, an uplink random access message comprising beam information; receiving, based at least in part on the beam information, a downlink random access message using a second beam; and establishing a connection with the base station based at least in part on the uplink random access message and the downlink random access message.

Aspect 2: The method of aspect 1, wherein transmitting the uplink random access message comprises: transmitting a third random access message in a first random access procedure, wherein the beam information comprises at least one beam index associated with the second beam.

Aspect 3: The method of aspect 2, wherein receiving the downlink random access message using the second beam comprises: receiving a fourth random access message in the first random access procedure using the second beam.

Aspect 4: The method of any of aspects 1 through 3, further comprising: receiving, based at least in part on the monitoring, one or more synchronization signals over the plurality of synchronization signal resources; performing one or more channel quality measurements on the one or more synchronization signals; and generating, based at least in part on performing the one or more channel quality measurements, one or more channel quality measurement values, wherein the beam information further comprises the one or more channel quality measurement values.

Aspect 5: The method of aspect 4, wherein the one or more channel quality measurement values comprise one or more absolute measurement values, one or more offset values from a first channel quality measurement value associated with the second beam, or a combination thereof.

Aspect 6: The method of any of aspects 1 through 5, wherein transmitting the uplink random access message comprises: transmitting a third random access message in a first random access procedure, wherein the beam information comprises channel state information, channel quality information, a precoding matrix indicator (PMI), an indication of a supported codebook, or a combination thereof.

Aspect 7: The method of aspect 6, wherein receiving the downlink random access message using the second beam comprises: receiving a fourth random access message in the first random access procedure, wherein the second beam comprises a combination of a third beam and a fourth beam.

Aspect 8: The method of any of aspects 1 through 7, wherein transmitting the uplink random access message comprises: transmitting a negative acknowledgement message requesting a retransmission of a fourth random access message in a first random access procedure, wherein the beam information comprises an indication of the second beam.

Aspect 9: The method of aspect 8, wherein receiving the downlink random access message using the second beam comprises: receiving the requested retransmission of the fourth random access message in the first random access procedure.

Aspect 10: The method of any of aspects 8 through 9, further comprising: identifying a first code point for transmitting an acknowledgement message to the base station; identifying a second code point for transmitting the negative acknowledgement message, the second code point associated with the second beam; and encoding the acknowledgement message and the indication of the second beam using the second code point, wherein transmitting the uplink random access message is based at least in part on the encoding.

Aspect 11: The method of any of aspects 1 through 10, wherein transmitting the uplink random access message comprises: transmitting a first random access message in a second random access procedure, wherein the beam information comprises at least one beam index associated with the second beam, an indication of a supported codebook, channel quality information, a precoding matrix indicator (PMI), or a combination thereof.

Aspect 12: The method of aspect 11, wherein receiving the downlink random access message using the second beam comprises: receiving a second random access message in the second random access procedure.

Aspect 13: The method of any of aspects 11 through 12, wherein the second beam comprises a combination of a third beam and a fourth beam.

Aspect 14: The method of any of aspects 1 through 13, wherein transmitting the uplink random access message comprises: transmitting a negative acknowledgement message requesting a retransmission of a second random access message in a second random access procedure, wherein the beam information comprises an indication of the second beam.

Aspect 15: The method of aspect 14, wherein receiving the downlink random access message using the second beam comprises: identifying a first code point for transmitting an acknowledgement message to the base station; identifying a second code point for transmitting the negative acknowledgement message, the second code point associated with the second beam; and encoding the acknowledgement message and the indication of the second beam using the second code point, wherein transmitting the uplink random access message is based at least in part on the encoding.

Aspect 16: The method of any of aspects 14 through 15, further comprising: determining that a number of configured repetitions of the second random access message in the second random access procedure satisfies a threshold value, wherein transmitting the negative acknowledgment message is based at least in part on determining that the number of configured repetitions satisfies the threshold value.

Aspect 17: The method of any of aspects 14 through 16, wherein the second random access message is directed to only the UE.

Aspect 18: A method for wireless communications at a base station, comprising: transmitting one or more synchronization signals on a plurality of synchronization signal resources, each synchronization signal resource of the plurality of synchronization signal resources associated with a beam of a set of beams; receiving, from a UE using a first beam, an uplink random access message comprising beam information; transmitting, based at least in part on the beam information, a downlink random access message using a second beam; and establishing a connection with the UE based at least in part on the uplink random access message and the downlink random access message.

Aspect 19: The method of aspect 18, wherein receiving the uplink random access message comprises: receiving a third random access message in a first random access procedure, wherein the beam information comprises at least one beam index associated with the second beam.

Aspect 20: The method of aspect 19, wherein transmitting the downlink random access message using the second beam comprises: transmitting a fourth random access message in the first random access procedure using the second beam.

Aspect 21: The method of any of aspects 18 through 20, wherein receiving the uplink random access message comprises: receiving a third random access message in a first random access procedure, wherein the beam information comprises channel state information, channel quality information, a precoding matrix indicator (PMI), an indication of a supported codebook, or a combination thereof.

Aspect 22: The method of aspect 21, wherein the channel quality information comprises one or more channel quality measurement values comprising one or more absolute measurement values, one or more offset values from a first channel quality measurement value associated with the second beam, or a combination thereof.

Aspect 23: The method of any of aspects 18 through 22, wherein receiving the downlink random access message using the second beam comprises: transmitting a fourth random access message in a first random access procedure, wherein the second beam comprises a combination of a third beam and a fourth beam.

Aspect 24: The method of any of aspects 18 through 23, wherein receiving the uplink random access message comprises: receiving a negative acknowledgement message requesting a retransmission of a fourth random access message in a first random access procedure, wherein the beam information comprises an indication of the second beam.

Aspect 25: The method of aspect 24, wherein transmitting the downlink random access message using the second beam comprises: transmitting the requested retransmission of the fourth random access message in the first random access procedure.

Aspect 26: The method of any of aspects 24 through 25, further comprising: decoding the negative acknowledgment message; and identifying a code point indicating the negative acknowledgement message and associated with the second beam, wherein transmitting the requested retransmission is based at least in part on identifying the code point.

Aspect 27: The method of any of aspects 18 through 26, wherein receiving the uplink random access message comprises: receiving a first random access message in a second random access procedure, wherein the beam information comprises at least one beam index associated with the second beam, an indication of a supported codebook, channel quality information, a precoding matrix indicator (PMI), or a combination thereof.

Aspect 28: The method of aspect 27, wherein transmitting the downlink random access message using the second beam comprises: transmitting a second random access message in the second random access procedure.

Aspect 29: The method of aspect 28, wherein the second beam comprises a combination of a third beam and a fourth beam.

Aspect 30: The method of any of aspects 18 through 29, wherein receiving the uplink random access message comprises: receiving a negative acknowledgement message requesting a retransmission of a second random access message in a second random access procedure, wherein the beam information comprises an indication of the second beam.

Aspect 31: The method of aspect 30, further comprising: decoding the negative acknowledgment message; and identifying a code point indicating the negative acknowledgement message and associated with the second beam, wherein transmitting the requested retransmission is based at least in part on identifying the code point.

Aspect 32: The method of any of aspects 30 through 31, wherein the second random access message is directed to only the UE.

Aspect 33: An apparatus for wireless communications at a UE, comprising at least one processor; memory coupled with the at least one processor; and instructions stored in the memory and executable by the at least one processor to cause the apparatus to perform a method of any of aspects 1 through 17.

Aspect 34: An apparatus for wireless communications at a UE, comprising at least one means for performing a method of any of aspects 1 through 17.

Aspect 35: A non-transitory computer-readable medium storing code for wireless communications at a UE, the code comprising instructions executable by at least one processor to perform a method of any of aspects 1 through 17.

Aspect 36: An apparatus for wireless communications at a base station, comprising at least one processor; memory coupled with the at least one processor; and instructions stored in the memory and executable by the at least one processor to cause the apparatus to perform a method of any of aspects 18 through 32.

Aspect 37: An apparatus for wireless communications at a base station, comprising at least one means for performing a method of any of aspects 18 through 32.

Aspect 38: A non-transitory computer-readable medium storing code for wireless communications at a base station, the code comprising instructions executable by at least one processor to perform a method of any of aspects 18 through 32.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with at least one general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by at least one processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by at least one processor, the functions may be stored on or transmitted over as one or more instructions or code on a computer-readable medium. Other examples and implementations are within the scope of the disclosure and appended claims. For example, due to the nature of software, functions described herein may be implemented using software executed by at least one processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or at least one general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
- monitoring a plurality of synchronization signal resources, each synchronization signal resource of the plurality of synchronization signal resources associated with a beam of a set of beams;
- determining that a number of configured repetitions of a random access message from a network entity satisfies a threshold value;
- transmitting, to the network entity using a first beam, an uplink random access message comprising beam information based at least in part on determining that the number of configured repetitions satisfies the threshold value, the beam information comprising one or more channel quality measurement values associated with a second beam, wherein the one or more channel quality measurement values comprise one or more offset values from a first channel quality measurement value associated with the second beam;
- receiving, based at least in part on the beam information comprising the one or more channel quality measurement values associated with the second beam, a downlink random access message using the second beam; and
- establishing a connection with the network entity based at least in part on the uplink random access message and the downlink random access message.

2. The method of claim 1, wherein transmitting the uplink random access message comprises:
- transmitting a third random access message in a first random access procedure, wherein the beam information further comprises at least one beam index associated with the second beam.

3. The method of claim 2, wherein receiving the downlink random access message using the second beam comprises:

receiving a fourth random access message in the first random access procedure using the second beam.

4. The method of claim 1, further comprising:

receiving, based at least in part on the monitoring, one or more synchronization signals over the plurality of synchronization signal resources;

performing one or more channel quality measurements on the one or more synchronization signals; and generating, based at least in part on performing the one or more channel quality measurements, the one or more channel quality measurement values, wherein the beam information comprises the one or more channel quality measurement values based at least in part on the generating.

5. The method of claim 4, wherein the one or more channel quality measurement values comprise one or more absolute measurement values, the one or more offset values from a first channel quality measurement value associated with the second beam, or a combination thereof.

6. The method of claim 1, wherein transmitting the uplink random access message comprises:

transmitting a third random access message in a first random access procedure, wherein the beam information further comprises channel state information, channel quality information, a precoding matrix indicator (PMI), an indication of a supported codebook, or a combination thereof.

7. The method of claim 6, wherein receiving the downlink random access message using the second beam comprises:

receiving a fourth random access message in the first random access procedure, wherein the second beam comprises a combination of a third beam and a fourth beam.

8. The method of claim 1, wherein transmitting the uplink random access message comprises:

transmitting a negative acknowledgement message requesting a retransmission of a fourth random access message in a first random access procedure, wherein the beam information further comprises an indication of the second beam.

9. The method of claim 8, wherein receiving the downlink random access message using the second beam comprises:

receiving the requested retransmission of the fourth random access message in the first random access procedure.

10. The method of claim 8, further comprising:

identifying a first code point for transmitting an acknowledgement message to the network entity;

identifying a second code point for transmitting the negative acknowledgement message, the second code point associated with the second beam; and encoding the acknowledgement message and the indication of the second beam using the second code point, wherein transmitting the uplink random access message is based at least in part on the encoding.

11. The method of claim 1, wherein transmitting the uplink random access message comprises:

transmitting a first random access message in a second random access procedure, wherein the beam information further comprises at least one beam index associated with the second beam, an indication of a supported codebook, channel quality information, a precoding matrix indicator (PMI), or a combination thereof.

12. The method of claim 11, wherein receiving the downlink random access message using the second beam comprises:

receiving a second random access message in the second random access procedure.

13. The method of claim 11, wherein the second beam comprises a combination of a third beam and a fourth beam.

14. The method of claim 1, wherein transmitting the uplink random access message comprises:

transmitting a negative acknowledgement message requesting a retransmission of a second random access message in a second random access procedure, wherein the beam information further comprises an indication of the second beam.

15. The method of claim 14, wherein receiving the downlink random access message using the second beam comprises:

identifying a first code point for transmitting an acknowledgement message to the network entity;

identifying a second code point for transmitting the negative acknowledgement message, the second code point associated with the second beam; and encoding the acknowledgement message and the indication of the second beam using the second code point, wherein transmitting the uplink random access message is based at least in part on the encoding.

16. The method of claim 14, further comprising:

determining that a number of configured repetitions of the second random access message in the second random access procedure satisfies the threshold value, wherein transmitting the negative acknowledgement message is based at least in part on determining that the number of configured repetitions satisfies the threshold value.

17. The method of claim 14, wherein the second random access message is directed to only the UE.

18. A method for wireless communications at a network entity, comprising:

transmitting one or more synchronization signals on a plurality of synchronization signal resources, each synchronization signal resource of the plurality of synchronization signal resources associated with a beam of a set of beams;

transmitting a number of configured repetitions of a random access message;

receiving, from a user equipment (UE) using a first beam, an uplink random access message comprising beam information based at least in part on the number of configured repetitions satisfying a threshold value, the beam information comprising one or more channel quality measurement values associated with a second beam, wherein the one or more channel quality measurement values comprise one or more offset values from a first channel quality measurement value associated with the second beam;

transmitting, based at least in part on the beam information comprising the one or more channel quality measurement values associated with the second beam, a downlink random access message using the second beam; and establishing a connection with the UE based at least in part on the uplink random access message and the downlink random access message.

19. An apparatus for wireless communications at a user equipment (UE), comprising:

at least one processor, memory coupled with the at least one processor; and instructions stored in the memory and executable by the at least one processor to cause the apparatus to:

monitor a plurality of synchronization signal resources, each synchronization signal resource of the plurality of synchronization signal resources associated with a beam of a set of beams;

determine that a number of configured repetitions of a random access message from a network entity satisfies a threshold value;

transmit, to the network entity using a first beam, an uplink random access message comprising beam information based at least in part on the number of configured repetitions satisfying the threshold value, the beam information comprising one or more channel quality measurement values associated with a second beam, wherein the one or more channel quality measurement values comprise one or more offset values from a first channel quality measurement value associated with the second beam;

receive, based at least in part on the beam information comprising the one or more channel quality measurement values associated with the second beam, a downlink random access message using the second beam; and establish a connection with the network entity based at least in part on the uplink random access message and the downlink random access message.

20. The apparatus of claim 19, wherein the instructions to transmit the uplink random access message are executable by the at least one processor to cause the apparatus to:

transmit a third random access message in a first random access procedure, wherein the beam information further comprises at least one beam index associated with the second beam.

21. The apparatus of claim 20, wherein the instructions to receive the downlink random access message using the second beam are executable by the at least one processor to cause the apparatus to:

receive a fourth random access message in the first random access procedure using the second beam.

22. The apparatus of claim 19, wherein the instructions are further executable by the at least one processor to cause the apparatus to:

receive, based at least in part on the monitoring, one or more synchronization signals over the plurality of synchronization signal resources;

perform one or more channel quality measurements on the one or more synchronization signals; and generate, based at least in part on performing the one or more channel quality measurements, the one or more channel quality measurement values, wherein the beam information comprises the one or more channel quality measurement values based at least in part on the generating.

23. The apparatus of claim 22, wherein the one or more channel quality measurement values comprise one or more absolute measurement values, the one or more offset values from a first channel quality measurement value associated with the second beam, or a combination thereof.

24. The apparatus of claim 19, wherein the instructions to transmit the uplink random access message are executable by the at least one processor to cause the apparatus to:

transmit a third random access message in a first random access procedure, wherein the beam information further comprises channel state information, channel quality information, a precoding matrix indicator (PMI), an indication of a supported codebook, or a combination thereof.

25. The apparatus of claim 24, wherein the instructions to receive the downlink random access message using the second beam are executable by the at least one processor to cause the apparatus to:

receive a fourth random access message in the first random access procedure, wherein the second beam comprises a combination of a third beam and a fourth beam.

26. The apparatus of claim 19, wherein the instructions to transmit the uplink random access message are executable by the at least one processor to cause the apparatus to:

transmit a negative acknowledgement message requesting a retransmission of a fourth random access message in a first random access procedure, wherein the beam information further comprises an indication of the second beam.

27. The apparatus of claim 26, wherein the instructions to receive the downlink random access message using the second beam are executable by the at least one processor to cause the apparatus to:

receive the requested retransmission of the fourth random access message in the first random access procedure.

28. The apparatus of claim 26, wherein the instructions are further executable by the at least one processor to cause the apparatus to:

identify a first code point for transmitting an acknowledgement message to the network entity;

identify a second code point for transmitting the negative acknowledgement message, the second code point associated with the second beam; and encode the acknowledgement message and the indication of the second beam using the second code point, wherein transmitting the uplink random access message is based at least in part on the encoding.

29. The apparatus of claim 19, wherein the instructions to transmit the uplink random access message are executable by the at least one processor to cause the apparatus to:

transmit a first random access message in a second random access procedure, wherein the beam information further comprises at least one beam index associated with the second beam, an indication of a supported codebook, channel quality information, a precoding matrix indicator (PMI), or a combination thereof.

30. An apparatus for wireless communications at a network entity, comprising:

at least one processor, memory coupled with the at least one processor; and instructions stored in the memory and executable by the at least one processor to cause the apparatus to:

transmit one or more synchronization signals on a plurality of synchronization signal resources, each synchronization signal resource of the plurality of synchronization signal resources associated with a beam of a set of beams;

transmit a number of configured repetitions of a random access message;

receive, from a user equipment (UE) using a first beam, an uplink random access message comprising beam information based at least in part on the number of configured repetitions satisfying a threshold value, the beam information comprising one or more channel quality measurement values associated with a second beam, wherein the one or more channel quality measurement values comprise one or more offset values from a first channel quality measurement value associated with the second beam;

transmit, based at least in part on the beam information comprising the one or more channel quality measurement values associated with the second beam, a downlink random access message using the second beam; and establish a connection with the UE based at least in part on the uplink random access message and the downlink random access message.

* * * * *